(12) United States Patent
Sugi et al.

(10) Patent No.: US 7,414,796 B2
(45) Date of Patent: Aug. 19, 2008

(54) OBJECTIVE LENS DESIGN METHOD, LENS, AND OPTICAL SYSTEM, OPTICAL HEAD, AND OPTICAL DISC APPARATUS USING THE SAME

(75) Inventors: Yasuyuki Sugi, Naka-gun (JP); Takesuke Maruyama, Yokohama (JP)

(73) Assignee: Hitachi Maxell, Ltd., Ibaraki (JP)

( * ) Notice: Subject to any disclaimer, the term of this patent is extended or adjusted under 35 U.S.C. 154(b) by 840 days.

(21) Appl. No.: 10/985,926

(22) Filed: Nov. 12, 2004

(65) Prior Publication Data
US 2005/0063284 A1    Mar. 24, 2005

Related U.S. Application Data

(63) Continuation of application No. 10/670,209, filed on Sep. 26, 2003, now Pat. No. 6,836,378, which is a continuation of application No. 10/330,289, filed on Dec. 30, 2002, now Pat. No. 6,678,096.

(30) Foreign Application Priority Data

Jan. 11, 2002  (JP) .............................. 2002-004993
Sep. 12, 2002  (JP) .............................. 2002-267451

(51) Int. Cl.
  *G02B 13/18*  (2006.01)
  *G11B 7/00*   (2006.01)
(52) U.S. Cl. .................. 359/719; 359/718; 369/112.01; 369/112.23
(58) Field of Classification Search ................. 359/718, 359/719, 708, 565, 566; 369/112.01, 112.08, 369/112.13, 112.23, 112.2
See application file for complete search history.

(56) References Cited

U.S. PATENT DOCUMENTS

| 6,118,594 | A  | 9/2000 | Maruyama  |
|-----------|----|--------|-----------|
| 6,285,646 | B1 | 9/2001 | Yoo et al. |
| 6,563,780 | B2 | 5/2003 | Kim et al. |
| 6,678,096 | B2 | 1/2004 | Sugi et al. |

(Continued)

FOREIGN PATENT DOCUMENTS

CN           1351337 A    5/2002

(Continued)

*Primary Examiner*—Ricky L Mack
*Assistant Examiner*—Jack Dinh
(74) *Attorney, Agent, or Firm*—Oliff & Berridge, PLC

(57) ABSTRACT

When the DVD provided with the DVD substrate 2 having thickness $t_2$ of 0.6 mm is installed in the optical disc apparatus, the light beam 4 having wavelength $\lambda_1$=655 nm is used as luminous flux of numerical aperture NA=0.63 to be condensed on the information surface 2a on the DVD substrate 2. When the CD provided with the CD substrate 3 having thickness $t_2$ of 1.2 mm is installed in the optical disc apparatus, the light beam 5 having wavelength $\lambda_2$=790 nm is effectively used as luminous flux of approximate numerical aperture NA=0.45 to be condensed on the information surface 3a on the DVD substrate 3. The wavefront aberration caused by a thickness difference between the DVD substrate 2 and CD substrate 3 is canceled out by the chromatic aberration caused by a wavelength difference between the light beams 4 and 5. Therefore, in spite of the difference in the transparent substrates, the light beams are suitably condensed respectively on the information surface 2a and 3a.

25 Claims, 11 Drawing Sheets

U.S. PATENT DOCUMENTS

| | | |
|---|---|---|
| 6,785,215 B2 | 8/2004 | Yamanouchi et al. |
| 2001/0036141 A1 | 11/2001 | Kim et al. |
| 2003/0095334 A1 | 5/2003 | Kim et al. |
| 2004/0036972 A1 | 2/2004 | Kimura et al. |

FOREIGN PATENT DOCUMENTS

| | | |
|---|---|---|
| CN | 1365013 A | 8/2002 |
| JP | A 9-145995 | 6/1997 |
| JP | A 2000-81566 | 3/2000 |
| JP | A 2001-51192 | 2/2001 |

OBJECTIVE LENS DESIGN METHOD, LENS, AND OPTICAL SYSTEM, OPTICAL HEAD, AND OPTICAL DISC APPARATUS USING THE SAME

This is a Continuation of application Ser. No. 10/670,209 filed Sep. 26, 2003, which is a Continuation of application Ser. No. 10/330,289 filed Dec. 30, 2002. The entire disclosure of the prior application is hereby incorporated by reference herein in its entirety.

TITLE OF THE INVENTION

Objective lens design method, lens, and optical system, optical head, and optical disc apparatus using the same.

CROSS-REFERENCE TO RELATED APPLICATION

The present invention is related to Japanese Patent Application Serial No. 2002-004993, and Japanese Patent Application Serial No. 2002-267451. They are hereby incorporated.

BACKGROUND OF THE INVENTION

1. Field of the Invention

The present invention relates to a design method for an objective lens installed in a recording and reproducing apparatus of a multiple wavelengths optical system using plural kinds of monochromatic lights which is compatible with optical storage medium of different types such as compact discs (CD) including a CD-R and digital versatile discs (DVD), an objective lens, a general-purpose multiple wavelengths lens, a multiple wavelengths optical system, an optical head, and an optical disc apparatus.

2. Related Background Art

Conventionally, a compatible optical disc apparatus capable of reproducing different types of optical discs such as a CD and DVD has been proposed. The CD and DVD (which will be hereinafter collectively called an optical disc) both are provided with transparent substrates, and there is provided an information surface on one side thereof. The optical disc has two transparent substrates combined together, and their information surfaces face each other, or the information surface faces the other transparent substrate as a protection substrate. To reproduce information signals stored in the above optical disc, the optical disc apparatus condenses a laser beam from a light source on the information surface of the optical disc through the transparent substrates. As detailed later, a wavelength of the laser beam differs between a CD and DVD. The optical disc apparatus uses an objective lens for condensing the laser beam. Here, the thickness of the transparent substrate provided with the information surface differs according to a type of the optical disc (a difference in a laser beam wavelength). While the transparent substrate of a CD is 1.2 mm in thickness, that of a DVD is 0.6 mm. For the optical disc apparatus to reproduce optical discs of different types, it is required to condense the laser beam on the information surface while the thickness of the transparent substrate differs with the type of the optical disc. Besides, a new optical disc apparatus using a blue laser of approximately 400 nm wavelength for reproducing information is recently proposed. Therefore, it is desirable for the optical disc apparatus to be compatible with the new optical disc in addition to the CD and the existing DVD.

One approach for the above optical disc apparatus is to provide a pickup with objective lens for different types of optical discs to change the objective lens in accordance with the type of the optical disc in use, or to provide pickups for different types of the optical discs to change the pickups in accordance with the type of the optical disc in use. However, for miniaturization and cost reduction, it is preferable to have a single objective lens usable for any types of the optical disc.

Known as this kind of an objective lens is one disclosed in Japanese Patent Application Laid-Open No. H09-145995, for example. A lens surface of the objective lens disclosed therein is radially sectioned into more than two loop zones, and every other loop zonal lens surfaces and the other every other loop zonal lens surfaces are different in refracting power. For a laser beam of the same wavelength, the every other loop zonal lens surfaces condense the laser beam on the information surface of the optical disc (DVD) provided with the thin transparent substrates (0.6 mm), and the other every other zonal lens surfaces condense the laser beam on the information surface of the optical disc (CD) provided with the thick transparent substrates (1.2 mm), for example.

Another example is one disclosed in Japanese Patent Application Laid-Open No. 2000-81566 (U.S. Pat. No. 6,118,594). It discloses the optical disc apparatus using a laser beam of the shorter wavelength (635 nm or 650 nm) for a DVD having the thinner transparent substrates while using a laser beam of the longer wavelength (780 nm) for a CD having the thicker transparent substrates. The optical disc apparatus is provided with the objective lens used in common for those laser beams. The objective lens has a diffractive lens structure having a plurality of minute loop zonal steps thickly formed on one side of a refractive lens having a positive refractive power. The diffractive lens structure is designed so that diffracted light of a laser beam having the shorter wavelength, and diffracted light of a laser beam having the longer wavelength, are condensed on the information surface respectively for the DVD provided with the thinner transparent substrate, and for the CD provided with the thicker transparent substrate. The lens is also designed to condense diffracted light having identical diffractive order for both the diffracted lights. The reason why a laser beam having the shorter wavelength is used for the DVD is because a storage density of the DVD is higher than that of the CD, thus requiring a smaller beam spot. As well known, the diameter of an optical spot is proportional to the wavelength and inversely proportional to the numerical aperture (NA).

There is also disclosed an objective lens of a loop zonal phase correction lens type provided with a loop zonal phase shifter formed on the lens surface thereof in Japanese Patent Application Laid-Open No. 2001-51192. First, a lens surface designed to have no wavefront aberration for a laser beam having wavelength $\lambda_1$ of 640 nm is set as a reference. A surface of the objective lens is then radially sectioned into plural loop refractive zones, which are formed to have predetermined steps (i-th step from a center of the lens is referred to as $d_i$) from the reference lens surface. Due to the step $d_i$, each of the refractive surfaces allows the laser beam of the DVD to phase-shift by integral multiple $m_i$ of the wavelength $\lambda_1$ against the reference lens surface, thereby reducing wavefront aberration in a CD system.

In any of the above conventional techniques, it is possible to use a common objective lens for both DVD and CD. It eliminates the need for changing members including an objective lens for each use of a DVD or CD, which is effective in reducing costs and simplifying the structure.

However, the technique disclosed in Japanese Patent Application Laid-Open No. H09-145995 uses different loop zonal lens surface of the objective lens from a DVD to CD. Accordingly, large area remains ineffective for an incident laser beam, which extremely lowers light use efficiency.

Also, the technique disclosed in Japanese Patent Application Laid-Open No. 2000-81566 (U.S. Pat. No. 6,118,594) has a problem that diffractive efficiencies for different wavelengths are unable to become 100% at the same time because it uses the diffracted light by the diffractive lens structure. In the diffractive lens, for a laser beam having the shorter wavelength (635 nm or 650 nm) used for a DVD and for a laser beam having the longer wavelength (780 nm) used for a CD, the diffractive efficiency is designed to become 100% at intermediate wavelength between the two, in order to make the diffractive efficiency well balanced for the laser beams in use. Besides, the technique requires minute steps to be formed on the lens surface for the diffraction lens structure, which is vulnerable to processing error. In a case where the diffractive structure fails to be formed as designed, it causes a decrease in the diffractive efficiently. When the diffractive efficiency decreases or when it does not reach 100%, it means incapability of condensing all the incident light on the information surface on the transparent substrate of the optical disc, which results in the light loss.

Further, while having the high light use efficiency, the loop zonal phase correction lens type as disclosed in Japanese Patent Application Laid-Open No. 2001-51192 also has a problem. It sets the lens surface designed to have no wavefront aberration for the DVD laser beam as a reference surface, and forms the refractive surfaces in $d_i$ step, $m_i$ integral multiple of the wavelength $\lambda_1$ of the DVD laser beam, below the reference lens surface, in order to reduce the wavefront aberration for the CD laser beam. However, setting the reference for the DVD and then merely forming steps from there does not sufficiently decrease the wavefront aberration for the CD laser beam.

SUMMARY OF THE INVENTION

The present invention has been accomplished to solve the above problems and an object of the present invention is thus to provide a design method for an objective lens which can condense light beams on an information surface with the lowered wavefront aberration and at the high light use efficiency, a lens and an optical system, an optical head, and an optical disc apparatus using the lens.

For the above object, the present invention provides a design method for an objective lens for plural types of optical storage medium having transparent substrates of different thickness, the objective lens receiving a light beam of a different wavelength for each of the plural types of optical storage medium and having a positive power to condense, by refraction, the light beam onto an information surface on each of the transparent substrates of the plural types of optical storage medium, in which a lens surface of the objective lens is designed in such a manner that chromatic aberration caused by a difference in wavelength of each of the light beams substantially cancels out spherical aberration caused by a thickness difference between the transparent substrates.

The present invention also provides a lens for an objective lens for plural types of optical storage medium having transparent substrates of different thickness, the objective lens receiving a light beam of a different wavelength for each of the plural types of optical storage medium and having a positive power to condense, by refraction, the light beam onto an information surface on each of the transparent substrates of the plural types of optical storage medium, in which the lens substantially cancels out spherical aberration caused by a difference in thickness between the transparent substrates with chromatic aberration caused by a difference in wavelength $\lambda$ of each of the light beams, by which the objective lens condenses the light beam onto the information surface with a Root Mean Square (RMS) wavefront aberration of no more than $0.035\lambda$, preferably no more than $0.033\lambda$, and more preferably no more than $0.030\lambda$, or with a RMS wavefront aberration satisfying a following formula:

$$\sqrt{(\Sigma W_i^2)/i} \leq 0.028 \qquad \text{Formula 1:}$$

($\lambda_i$ (i=1, 2, ...) is a wavelength of the i-th light beam, $\Sigma W_i^2$ is sum of square of each RMS wavefront aberration for all wavelengths, and $W_i \cdot \lambda_i$ is a RMS wavefront aberration of light beam having wavelength $\lambda_i$), for each of the plural types of optical storage medium.

The present invention also provides an objective lens condensing light beams on the information surfaces, with the left side of Formula 1 having a value of no more than 0.026, preferably no more than 0.025, and more preferably no more than 0.023, or with a RMS wavefront aberration ratio of $W_{max}/W_{min} < 1.8$, preferably $W_{max}/W_{min} < 1.6$, and more preferably $W_{max}/W_{min} < 1.4$, where $W_{max}$ is a maximum RMS wavefront aberration among RMS wavefront aberrations of each of the light beams and $W_{min}$ is a minimum RMS wavefront aberration among RMS wavefront aberrations of each of the light beams. Or, there is provided a lens for an objective lens for plural types of optical storage medium, the objective lens receiving a light beam of a different wavelength for each of the plural types of optical storage medium and having a positive power to condense, by refraction, the light beam onto an information surface on each of the transparent substrates of the plural types of optical storage medium, and the lens condensing the light beam onto the information surface with a Root Mean Square (RMS) wavefront aberration of no more than $0.035\lambda$ for each of the plural types of optical storage medium.

Besides, in order to produce a suitable RMS wavefront aberration in a multiple wavelengths optical system including a multiple wavelengths lens condensing, by refraction, plural kinds of monochromatic lights, the present invention provides a multiple wavelengths optical system as described below, using a fact that one focal point of one monochromatic light differs from other focal points of other monochromatic lights. The present invention provides a lens having a lens surface sectioned into plural aspherical zones having different refractive power in a common use area for all monochromatic lights, in which the plural sectioned aspherical zones respectively have one common single focal point corresponding to an inherent wavelength of each of the monochromatic lights, one focal point corresponding to the inherent wavelength of one of the monochromatic lights is arranged in different position with other focal points corresponding to the inherent wavelengths of other monochromatic lights, each of the aspherical zones, with regard to each of the monochromatic lights, differs in optical path length from each other by approximately integral multiple of wavelength $\lambda_i$ of each of the monochromatic lights, and when a difference between a maximum value and a minimum value of a wavefront aberration of each of the monochromatic lights in each of the aspherical zones is ($\Delta V_d(\lambda_i)$) where d is an integral number of 1, 2 . . . , meaning each of the aspherical zones, and i is an integral number of 1, 2 . . . , meaning each of the monochromatic lights, each ratio of the differences of each of the monochromatic lights in each of the aspherical zones is between 0.4 and 2.5.

In the above multiple wavelengths optical system, it is preferable that the difference in the wavefront aberration of each of the monochromatic lights having wavelength $\lambda_i$ in each of the aspherical zones is no more than $0.14\lambda$. In a case where the plural wavelengths are dual wavelengths, it is applicable, for example, to a dual wavelengths optical system with the longer wavelength around 790 nm for CD and the shorter wavelength of 655 nm, to a dual wavelengths optical system with the longer wavelength of around 655 nm and the shorter wavelength of around 405 nm, to a dual wavelength optical system with the longer wavelength of around 790 nm and the shorter wavelength of around 405 nm, and further to a triple wavelengths optical system using those three wavelengths. Especially for the dual wavelengths optical systems, the wavefront aberrations preferably have symmetric figures.

The present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1A:
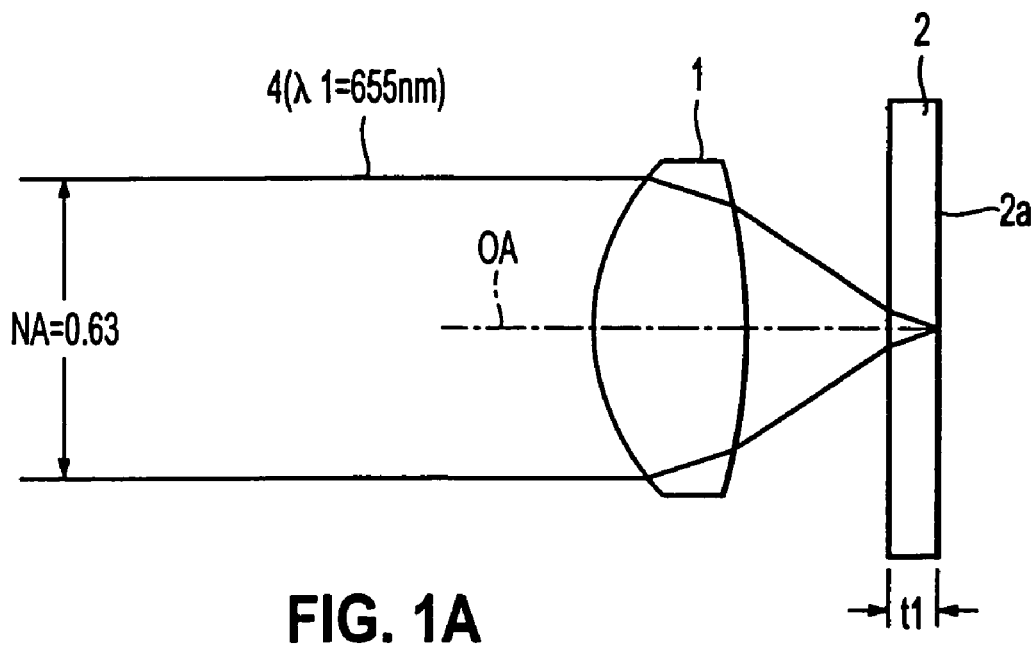
FIGS. 1A and 1B are diagrams to show the first embodiment of an objective lens according to the present invention.

In an optical disc apparatus, for example, aberration in an objective lens is appropriately corrected for the first optical disc provided with a transparent substrate having a thickness of ti so as to suitably condense laser beams on an information surface formed on the transparent substrate. When the second optical disc provided with a transparent substrate having a different thickness of $t_2$ is installed in the optical disc apparatus, due to the difference of the substrate thickness $t_2$ from $t_1$, the objective lens and the transparent substrate of $t_2$ thickness generate spherical aberration. Therefore, it is unable to suitably condense the laser beams on a information surface formed on the transparent substrate of $t_2$ in thickness.

On the other hand, when laser beams having different wavelengths are used for a optical system consisting of the objective lens and transparent substrate, chromatic aberration is generated. The chromatic aberration in this embodiment is a difference in spherical aberrations generated for each laser beam when an objective lens receives a laser beam having different wavelengths. For example, chromatic aberration generated when an objective lens receives a laser beam of 655 nm wavelength and that of 790 nm wavelength is the difference between spherical aberration generated when the objective lens receives the laser beam of 655 nm wavelength and spherical aberration generated when the objective lens receives the laser beam of 790 nm wavelength. The present invention reduces the wavefront aberration caused by a difference in thickness between substrates, using the chromatic aberration. More specifically, the present invention uses a laser beam having a different wavelength for each of optical discs respectively provided with substrates having different thickness, and cancels out the spherical aberration caused by a difference in thickness between substrates with the chromatic aberration caused by a difference in wavelength of each of laser beams so that the aberrations together fall in the allowable range for the substrate of any thickness.

On condition that the spherical aberration in the substrate thickness $t_1$ is $S_A(t_1)$, and that in the thickness $t_2$ is $S_A(t_2)$, and the spherical aberration in the laser beam wavelength $\lambda_1$ is $S_A(\lambda_1)$, and that in the wavelength $\lambda_2$ is $S_A(\lambda_2)$, the chromatic aberration caused by a difference in wavelength is expressed by the difference in the spherical aberration $(S_A(\lambda_2)-S_A(\lambda_1))$. The present invention designs a lens surface possibly satisfying the following formula.

$$S_A(t_2)-S_A(t_1)=-(S_A(\lambda_2)-S_A(\lambda_1))\qquad \text{Formula 2:}$$

In this configuration, for any optical discs provided with substrates having different thickness, when using a laser beam having a wavelength corresponding to a substrate thickness, all the light rays of the laser beam which have passed an objective lens and substrate take optical path length to suitably condense on an information surface of the substrate.

As detailed later, a lens according to a preferred embodiment of the present invention has such a configuration that a lens surface is sectioned into plural aspherical zones, and each of the aspherical zones has one common single focal point corresponding to the inherent wavelength of one of the monochromatic lights, and one focal point corresponding to the inherent wavelength of one of the monochromatic lights is arranged in different position with other focal points corresponding to the inherent wavelengths of other monochromatic lights.

A case where a laser beam is condensed on an information surface $2a$ of a substrate 2 with an objective lens 1 will be explained hereinafter with reference to FIG. 3. A surface A of the objective lens 1 is a light incident side, and a surface B is a light output side. The information surface $2a$ is on the reverse of the side facing the objective lens 1.

Figure 3:
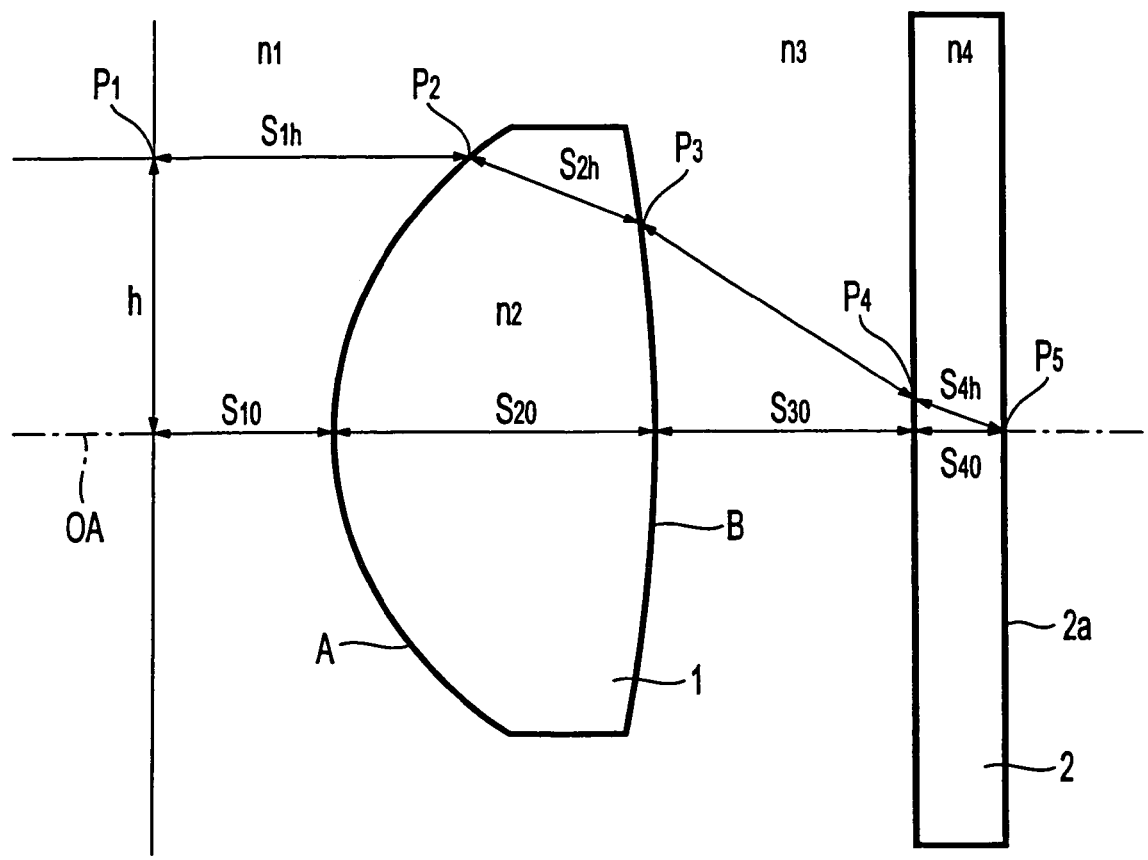
FIG. 3 is a diagram to explain optical path length in a optical system consisting of an objective lens and a transparent substrate of an optical disk.

In FIG. 3, a laser beam entering the objective lens 1 is parallel light (thus, the optical system shown in FIG. 3 is a so-called infinite optical system), and there is schematically shown a light path of a light beam starting from the optical axis OA of the objective lens 1, passing through a point $P_1$ located vertically h distant (light height) apart from the optical axis OA, and reaching a point $P_5$ where it crosses with the optical axis OA (a condensing point). Here, where an incident point to the objective lens 1 on the light path is $P_2$, and an output point from the objective lens 1 is $P_3$, and an incident point to the transparent substrate 2 is $P_4$, and The point $P_1$~The incident point $P_2$:
Clearance=$S_{1h}$, Refractive index=$n_1$
The incident point $P_2$~The output point $P_3$:
Clearance=$S_{2h}$, Refractive index=$n_2$
The output point $P_3$~The incident point $P_4$:
Clearance=$S_{3h}$, Refractive index=$n_3$
The incident point $P_4$~The condensing point $P_5$:
Clearance=$S_{4h}$, Refractive index=$n_4$.

an optical path length $L_h$ from the point $P_1$ to the condensing point $P_5$ is expressed by the following formula:

$$L_h = n_1 \times S_{1h} + n_2 \times S_{2h} + n_3 \times S_{3h} + n_4 \times S_{4h} \quad \text{Formula 3:}$$

The optical path length $L_h$ on the optical axis OA is when h=0 in Formula 3.

Formula 3 is applicable to any light height h. When aberration is corrected, the condensing point $P_5$ for each light height h is on the information surface 2a within allowable ranges. The present invention uses a laser beam having different wavelengths respectively for each of substrates having different thickness; therefore, the spherical aberration and the chromatic aberration cancel each other out so that the condensing point $P_5$ for each light height h is on the information surface 2a within each of the allowable ranges.

A technique of sectioning an area of a lens surface where both the wavelengths are used in common, into plural aspherical zones when using a monochromatic light $\lambda_1$ of 790 nm wavelength for CD and a monochromatic light $\lambda_2$ of 655 nm wavelength for DVD, for example, is as follows. According to the technique, optical path length of one aspherical zone differs from that of another by integral multiple of the wavelength $\lambda_i$ of each of the monochromatic lights. Further, the difference between a maximum value and a minimum value of wavefront aberration for each of the monochromatic lights in each of the aspherical zones is $\Delta V_d(\lambda_1)$ and $\Delta V_d(\lambda_2)$ where d is an integral number of 1, 2 . . . , meaning each aspherical section. With those conditions, ratio between the differences of each of the monochromatic lights is between 0.4 and 2.5, preferably between 0.5 and 2.0, in any aspherical section, thus producing the RMS wavefront aberration of a whole lens within the allowable range for both the wavelengths. When the optical path length, when the light height h=0, is $L_0$, and the optical path length of each light height is $L_h$, the wavefront aberration $V_h$ is expressed by the following formula:

$$V_h = (L_h - L_0)/\lambda_i \quad \text{Formula 4:}$$

Figure 10:
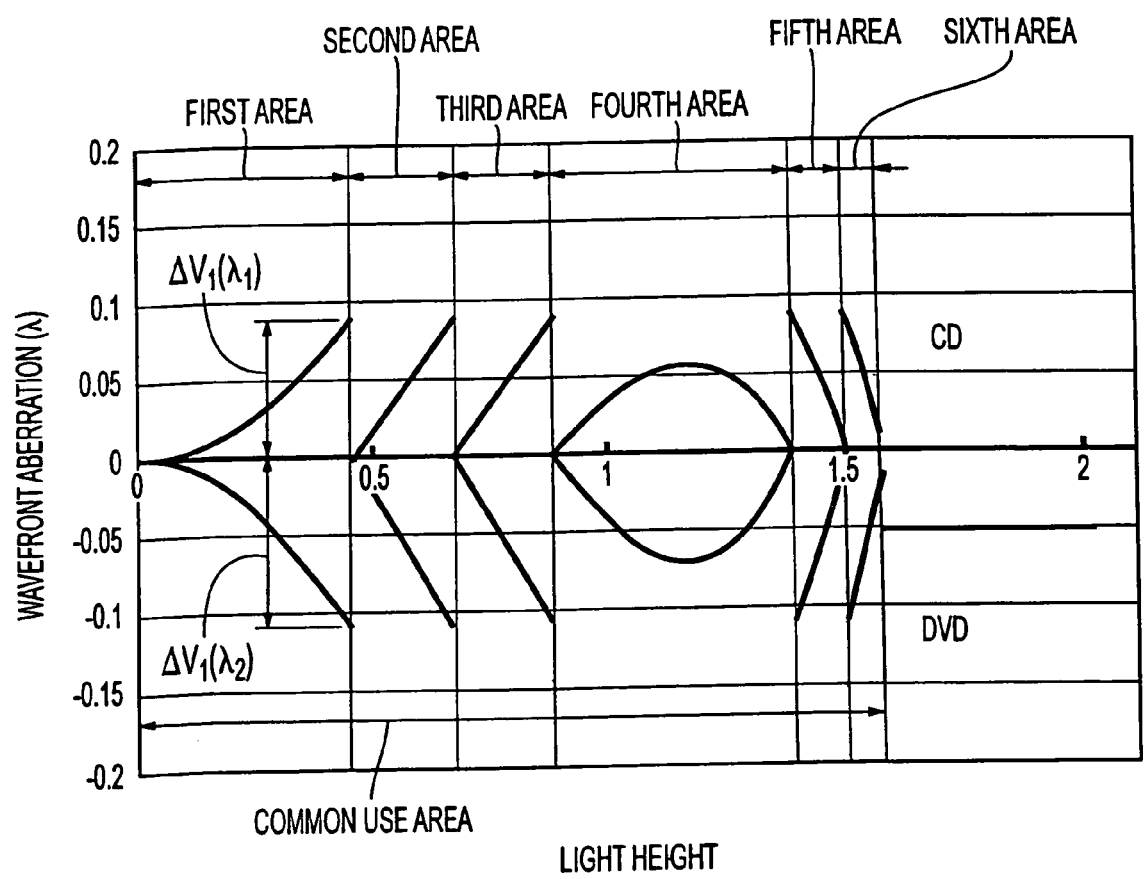
FIG. 10 is a pattern diagram to show wavefront aberration for each wavelength for light height.

FIG. 10 schematically shows comparisons between the wavefront aberrations by a lens for CD wavelength and those for DVD wavelength. In FIG. 10, the horizontal axis shows light height, and the vertical axis shows wavelength aberration, and the upper half shows wavefront aberration in each aspherical section for a CD, and the lower half shows wavefront aberration in each aspherical section for a DVD as calculated by the above formula. For example, in the first area of the aspherical section, the difference between the maximum value and the minimum value of the wavefront aberration within the aspherical section is defined as $\Delta V_d(\lambda_1)$ and $\Delta V_d(\lambda_2)$. As obvious from a later embodiment, according to the present invention, ratio of the differences falls in the range of 0.4 through 2.5 in any aspherical section. Namely, in the present invention, each aspherical section has uniform distribution of the wavefront aberration for any wavelength, which is different from conventional techniques configuring a lens surface based on one wavelength and correcting wavefront aberration in the other wavelength using phase lag. The integral multiple in the common use area is preferably in the range between 0 and ±10, and more preferably in between 0 and ±5, provided that the multiple number in at least adjacent aspherical zones is not 0.

A multiple wavelengths lens according to the present invention is capable of obtaining more suitable optical properties in each wavelength by setting the difference between the maximum value and the minimum value of the wavefront aberration for each wavelength to be no more than $0.14\lambda_i$ (for example, no more than 110.6 nm for 790 nm wavelength, and 91.7 nm for 655 nm wavelength), preferably no more than $0.12\lambda_i$, and more preferably no more than $0.10\lambda_i$, in each area of any aspherical zones.

Further, according to the present invention, when a multiple wavelengths lens on which the wavefront aberration for each wavelength becomes approximate symmetric figures is employed in a dual wavelengths optical system, two wavelengths are well balanced, thereby further reducing the RMS wavefront aberration.

Regarding the reduction of RMS wavefront aberration, the RMS wavefront aberration for a CD is determined by the wavefront aberration only in a common use area for a DVD and CD which is up to 1.58 mm light height in FIG. 10. On the other hand, there is a DVD sole use area (the range of 1.58 to 2.02 mm light height in FIG. 10) outside of the common use area, and the RMS wavefront aberration for a DVD is determined by the wavefront aberration both in the common use area and in the sole use area. Therefore, in a case of the DVD, even if the wavefront aberration in the common use area is little too large, by correcting the wavefront aberration for the DVD in complete disregard for those for the CD in the DVD sole use area, it is possible to sufficiently reduce the RMS wavefront aberration for the DVD to fall in the allowable range. For instance, in the diagram shown in FIG. 10, in the common use area for the DVD and CD, the wavefront aberration for the DVD is 0 to $-0.106\lambda$, and that for the CD is 0 to $+0.088$, which is, the wavefront aberration for the CD is smaller than that for the DVD. The wavefront aberration in the DVD sole use area is $-0.052\lambda$. The RMS wavefront aberration for the DVD is thus $0.0212\lambda$ RMS, and that for the CD is $0.0222\lambda$ RMS; therefore, the RMS wavefront aberrations for the DVD and for the CD are approximately equal. In this manner, in order to produce the same RMS wavefront aberrations for the DVD and CD, it is effective to make the wavefront aberration for the CD smaller than that for the DVD in the DVD and CD common use area, and then adjust the RMS wavefront aberration for the DVD by reducing the aberration in the DVD sole use area. Likewise, for producing the RMS wavefront aberrations of the different ratio between the DVD and CD, it should be counted that the wavefront aberration for the DVD can be reduced in the sole use area even when the aberration generated in the common use area is little too large.

The above embodiment of the present invention makes it possible to form appropriate optical spots on the information surface for any types of the optical discs provided with the substrates having different thickness. The present invention is applicable to a case where the disc substrates do not have different thickness, which is, a case with the same substrate thickness and different wavelengths, by making the condensing points $P_5$ respectively fall within allowable ranges. Further, the present invention is not limited to be applied to optical storage medium, but also applicable to a case where laser beams having different wavelengths are passed through a single lens or optical system for optical communication.

In the following, preferred embodiments of the present invention will be explained with reference to the accompanying drawings, taking two types of optical discs provided with transparent substrates having different thickness, that are, a DVD and CD, as an example. A lens according to the first embodiment of the present invention is made by forming resin made of amorphous polyolefin by injection molding because it is simple in manufacturing. A lens according to the second embodiment has a refractive index of glass, and it can have a refractive index of plastic resin when lens material is plastic resin.

Figure 1B:
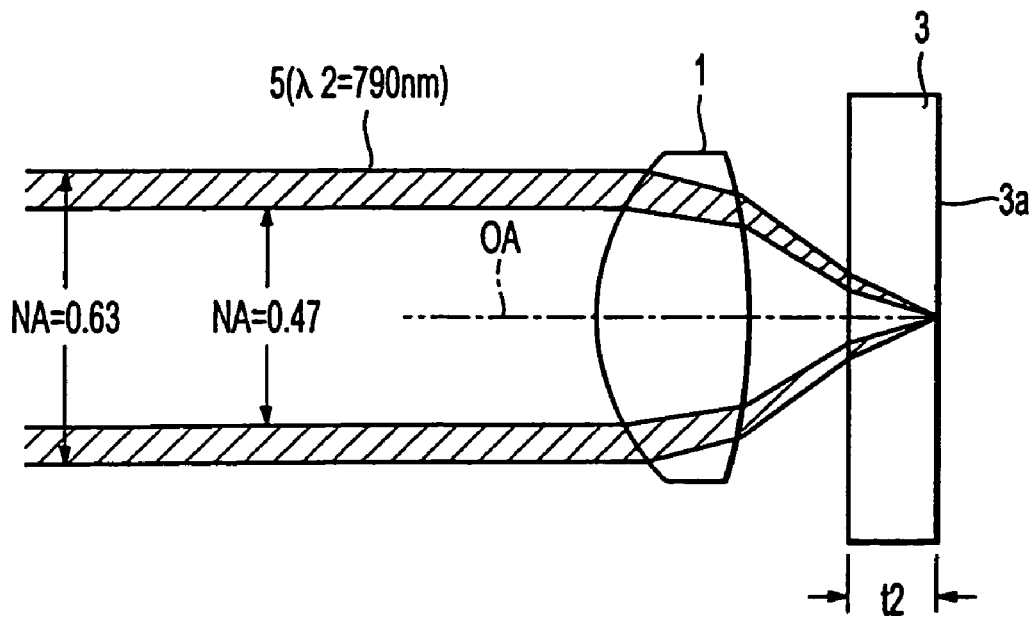

FIGS. 1A and 1B are diagrams to show the first embodiment of an objective lens according to the present invention, and FIG. 1A is for a DVD, and FIG. 1B is for a CD. In FIGS. 1A and 1B, reference symbol 1 denotes an objective lens according to the present embodiment, 2 denotes a transparent substrate of a DVD (which will be hereinafter referred to as a DVD substrate), 3 denotes a transparent substrate of a CD (a CD substrate), and 4 and 5 denote laser beams.

In FIG. 1A, the optical lens 1 is mounted in an optical head (not shown) of an optical disc apparatus. A DVD is installed in the optical disc apparatus, and the objective lens 1 condenses the laser beam 4 as a parallel light, thereby processing recording or reproducing. Here, the DVD substrate 2 has the thickness $t_1$ of 0.6 mm, and the laser beam 4 has wavelength $\lambda_1=655$ nm, being a luminous flux having numerical aperture (NA)=0.63. Under such conditions, the laser beam is condensed on the information surface 2a formed on the DVD substrate 2 on the reverse of the side facing the objective lens 1.

FIG. 1B shows a case installing a CD in the same optical disc apparatus as above, and processing recording and reproducing using the same objective lens 1. Here, the CD substrate 3 has the thickness $t_2$ of 1.2 mm. Though the laser beam 5 has wavelength $\lambda_2=790$ nm, being a luminous flux having numerical aperture (NA)=approximately 0.63, luminous flux of NA=0.47 is substantially condensed on the information surface 3a on the CD substrate 3, and luminous flux of NA=approximately 0.47 to 0.63 shown by hatching which goes through a path apart from an optical axis OA of the objective lens is not condensed on the information surface 3a. The lens area where NA is approximately up to 0.47 is thus a common use area for the DVD and CD.

As explained above, in order to reduce the aberrations for both DVD and CD so as to produce appropriate optical spots on the information surfaces 2a and 3a, the first embodiment configures a lens surface of the objective lens 1 so that optical path length $L_h$ expressed by Formula 5 has a value within the allowable range for any light height h in both cases for DVD and CD. An example of such lens surface configuration will be explained hereinafter with reference to FIG. 2.

Figure 2:
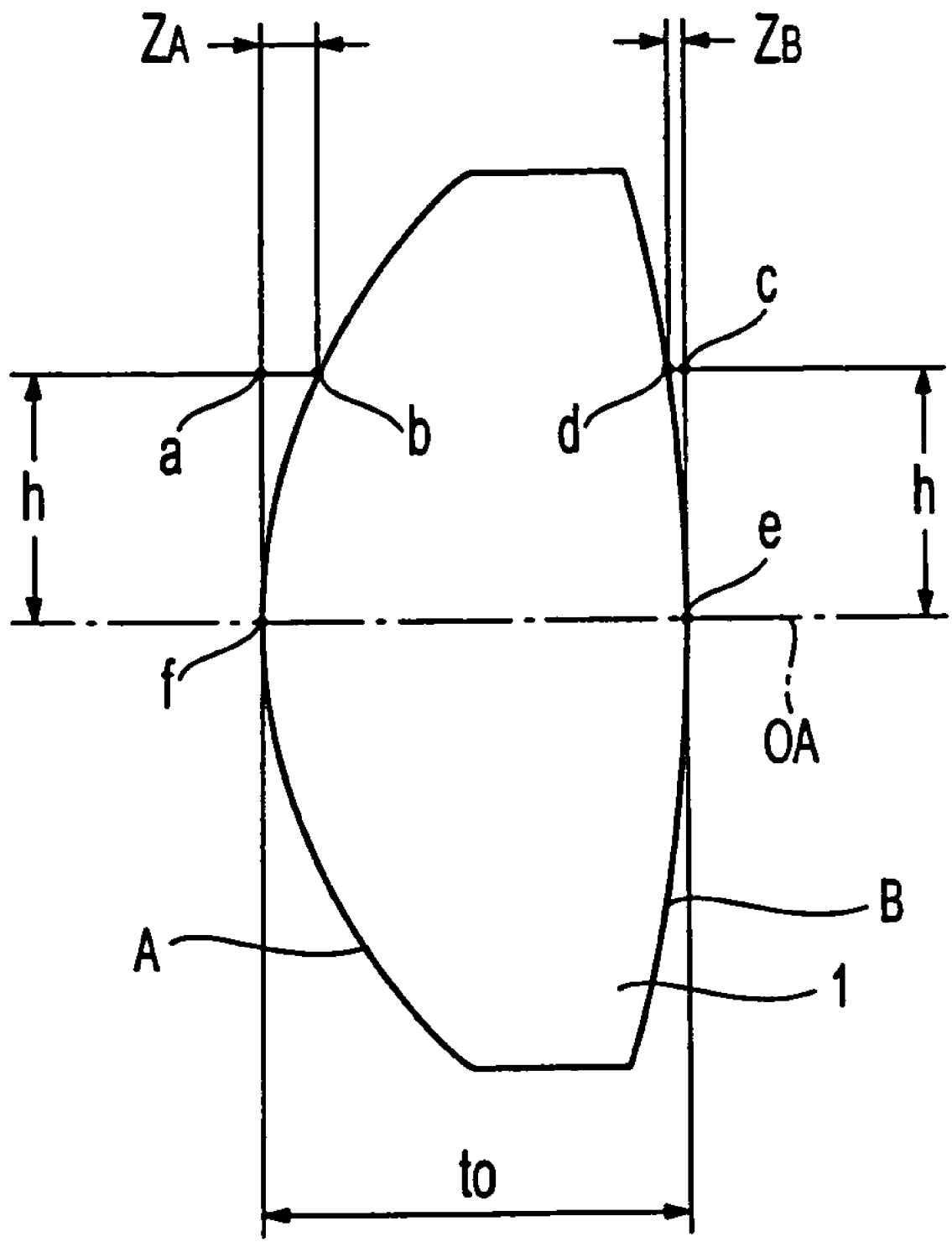
FIG. 2 is a diagram to show an example of a lens surface configuration according to the first embodiment shown in FIG. 1.

In FIG. 2, for a light output side B of the objective lens 1, a point at light height h is c, and a point on the light output side B parallel to the optical axis OA from the point c is d. The surface configuration of the light output side B is expressed with a distance $Z_B$ between the points c and d for any light height h by the following formula:

Formula 5:

$$Z_B = \frac{Ch^2}{1+\sqrt{1-(K+1^2)Ch^2}} + A_4 \cdot h^4 + A_6 \cdot h^6 + A_8 \cdot h^8 + A_{10} \cdot h^{10},$$

where C=−0.12301 K=3.312138
$A_4$=0.01628151 $A_6$=−0.004311717
$A_8$=0.000682316 $A_{10}$=−0.00004157469

Substitution of numeral values into the above factor C, K, $A_4$, $A_6$, $A_8$, and $A_{10}$ in Formula 5 gives a value of the distance $Z_B$ for any light height h ($\int 0$) as negative, which means that the point d on the light output side B is positioned closer to the input side (left side in FIG. 2) compared with the point c, that is, a surface apex e of the light output side B through which the optical axis OA passes. On the contrary, when the distance $Z_B$ is a positive value, it means that the point d is positioned at the right side of the point e.

Now, for a light incident side A of the objective lens 1, a point at light height h is a, and a point on the light incident side A parallel to the optical axis OA from the point a is b. The lens surface of the light incident side A is configured so that the light height h (mm) and a distance $Z_A$ (mm) between the points a and b for the light height h have relations as shown in the following table:

TABLE 1

| h(mm) | ZA(mm) |
|---|---|
| 0.00 | 0.000000 |
| 0.02 | 0.000095 |
| 0.04 | 0.000378 |
| 0.06 | 0.000851 |
| 0.08 | 0.001513 |
| 0.10 | 0.002365 |
| 0.12 | 0.003405 |
| 0.14 | 0.004635 |
| 0.16 | 0.006055 |
| 0.18 | 0.007664 |
| 0.20 | 0.009462 |
| 0.22 | 0.011451 |
| 0.24 | 0.013629 |
| 0.26 | 0.015998 |
| 0.28 | 0.018557 |
| 0.30 | 0.021308 |
| 0.32 | 0.024249 |
| 0.34 | 0.027382 |
| 0.36 | 0.030707 |
| 0.38 | 0.034224 |
| 0.40 | 0.037934 |
| 0.42 | 0.041838 |
| 0.44 | 0.045936 |
| 0.46 | 0.050229 |
| 0.48 | 0.054718 |
| 0.50 | 0.059403 |
| 0.52 | 0.065640 |
| 0.54 | 0.070725 |
| 0.56 | 0.076008 |
| 0.58 | 0.081490 |
| 0.60 | 0.087172 |
| 0.62 | 0.093056 |
| 0.64 | 0.099141 |
| 0.66 | 0.105429 |
| 0.68 | 0.111921 |
| 0.70 | 0.118619 |
| 0.72 | 0.125522 |
| 0.74 | 0.132634 |
| 0.76 | 0.139954 |
| 0.78 | 0.148855 |
| 0.80 | 0.156597 |
| 0.82 | 0.164550 |
| 0.84 | 0.172714 |
| 0.86 | 0.181092 |
| 0.88 | 0.189684 |
| 0.90 | 0.198492 |
| 0.92 | 0.207517 |
| 0.94 | 0.216760 |
| 0.96 | 0.226225 |
| 0.98 | 0.235911 |
| 1.00 | 0.245821 |
| 1.02 | 0.255956 |
| 1.04 | 0.266319 |
| 1.06 | 0.276910 |
| 1.08 | 0.287733 |
| 1.10 | 0.298787 |
| 1.12 | 0.310076 |
| 1.14 | 0.321601 |

TABLE 1-continued

| h(mm) | ZA(mm) |
|---|---|
| 1.16 | 0.333364 |
| 1.18 | 0.345367 |
| 1.20 | 0.357611 |
| 1.22 | 0.370098 |
| 1.24 | 0.382830 |
| 1.26 | 0.395809 |
| 1.28 | 0.409037 |
| 1.30 | 0.422515 |
| 1.32 | 0.436245 |
| 1.34 | 0.450229 |
| 1.36 | 0.463024 |
| 1.38 | 0.477531 |
| 1.40 | 0.492299 |
| 1.42 | 0.507330 |
| 1.44 | 0.522625 |
| 1.46 | 0.538186 |
| 1.48 | 0.552559 |
| 1.50 | 0.568667 |
| 1.52 | 0.585050 |
| 1.54 | 0.600234 |
| 1.56 | 0.617173 |
| 1.58 | 0.634395 |
| 1.60 | 0.653186 |
| 1.62 | 0.670934 |
| 1.64 | 0.688969 |
| 1.66 | 0.707293 |
| 1.68 | 0.725908 |
| 1.70 | 0.744816 |
| 1.72 | 0.764020 |
| 1.74 | 0.783521 |
| 1.76 | 0.803322 |
| 1.78 | 0.823424 |
| 1.80 | 0.843830 |
| 1.82 | 0.864540 |
| 1.84 | 0.885559 |
| 1.86 | 0.906886 |
| 1.88 | 0.928525 |
| 1.90 | 0.950477 |
| 1.92 | 0.972744 |
| 1.94 | 0.995329 |
| 1.96 | 1.018233 |
| 1.98 | 1.041459 |
| 2.00 | 1.065009 |
| 2.02 | 1.088887 |
| 2.04 | 1.113094 |
| 2.06 | 1.137635 |
| 2.08 | 1.162512 |
| 2.10 | 1.187732 |
| 2.12 | 1.213298 |

The light output side B of the objective lens 1 as expressed by Formula 5 and the light incident side A as shown in sequence data of Table 1 both have continuous aspherical surfaces. Also, the distance between the surface apexes f and e on the optical axis of the objective lens 1, that is, center thickness $t_0$, is 2.2 mm. The refractive index n for wavelength $\lambda_1=655$ nm (DVD) is 1.54014, and the refractive index n for wavelength $\lambda_2=790$ nm (CD) is 1.5365.

(i) Here, an allowable value for the aberration for evaluation is the RMS wavefront aberration of $0.035\lambda$, preferably $0.033\lambda$, and more preferably $0.030\lambda$ for both DVD (wavelength $\lambda_1=655$ nm) and CD (wavelength $\lambda_2=790$ nm) when an incident laser beam into the objective lens 1 has the incident angle of 0°, which is, when it is a parallel light to the optical axis OA. In the first embodiment, the light output side B and light incident side A are designed to have the above surface configuration so that the wavefront aberrations for the DVD and CD are under such allowable value.

While the first embodiment describes a case using two kinds of different wavelengths $\lambda_1$ and $\lambda_2$, it is the same in a case using n kinds (n is an integral number of 2 and above) of different wavelengths $\lambda_i$ (i=1, 2, ..., n).

(ii) In a case using n kinds of wavelength $\lambda_i$, when each of the RMS wavefront aberration, where an incident laser beam of the wavelength $\lambda_i$ has the incident angle of 0° is $W_i \cdot \lambda_i$, the aberration satisfies the following formula:

$$\sqrt{(\Sigma W_i^2)/i} \leq W_0,$$  Formula 6:

where the wavelength of i-th light beam is $\lambda_i$ (i=1, 2, ...), sum of square of each RMS wavefront aberration for all the wavelengths is $\Sigma W_i^2$, and the RMS wavefront aberration of light beam having wavelength $\lambda_i$ is $W_i \cdot \lambda_i$. The allowable value $W_0$ here is 0.028, preferably 0.026, and more preferably 0.025, further preferably 0.023. In the first embodiment where the RMS wavefront aberration for a DVD is $W_1$, that for a CD is $W_2$, and i=1, 2, the Formula 6 becomes as follows:

$$\sqrt{(W_1^2+W_2^2)/2} \leq W_0$$  Formula 7:

(iii) In a case using laser beams having n kinds of different wavelengths $\lambda_i$, when the maximum RMS wavefront aberration is $W_{max}$ and the minimum RMS wavefront aberration is $W_{min}$, of the n kinds of different wavelength $\lambda_i$, it satisfies the following formula:

$$1 \leq W_{max}/W_{min} < W_{th}$$

The allowable value $W_{th}$ in this case is 1.8, preferably 1.6, and more preferably 1.4. In the case of the first embodiment, one of the RMS wavefront aberrations $W_1$ for a DVD and the RMS wavefront aberration $W_2$ for a CD is the maximum RMS wavefront aberration $W_{max}$, and the other is the minimum RMS wavefront aberration $W_{min}$.

Figure 4A:
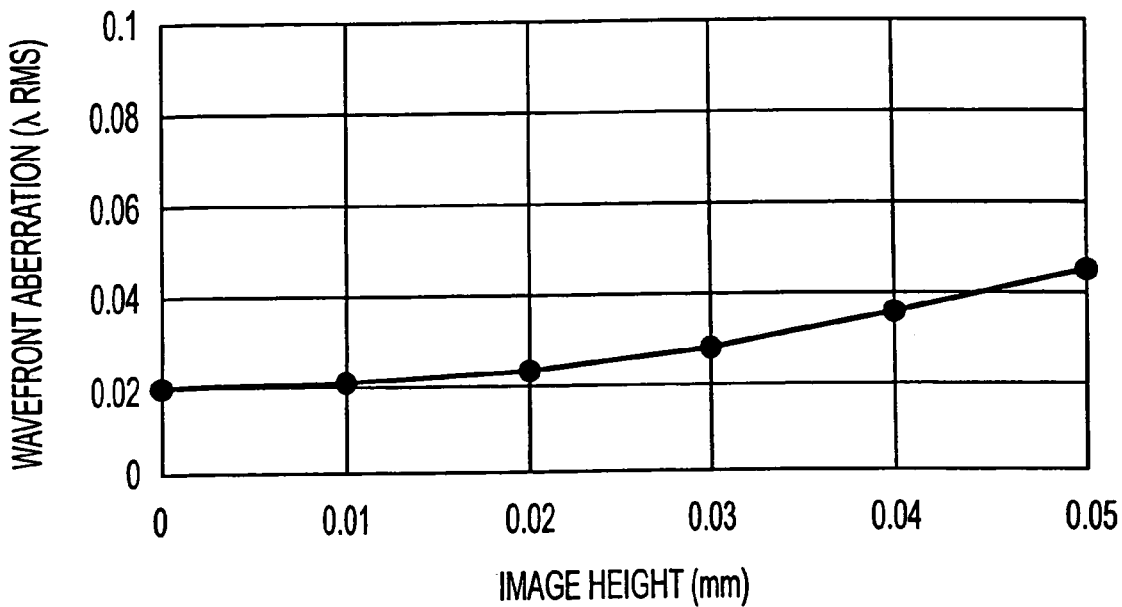
FIGS. 4A and 4B are graphs to show an example of a measurement result of wavefront aberration according to the first embodiment shown in FIG. 1.
Figure 4B:
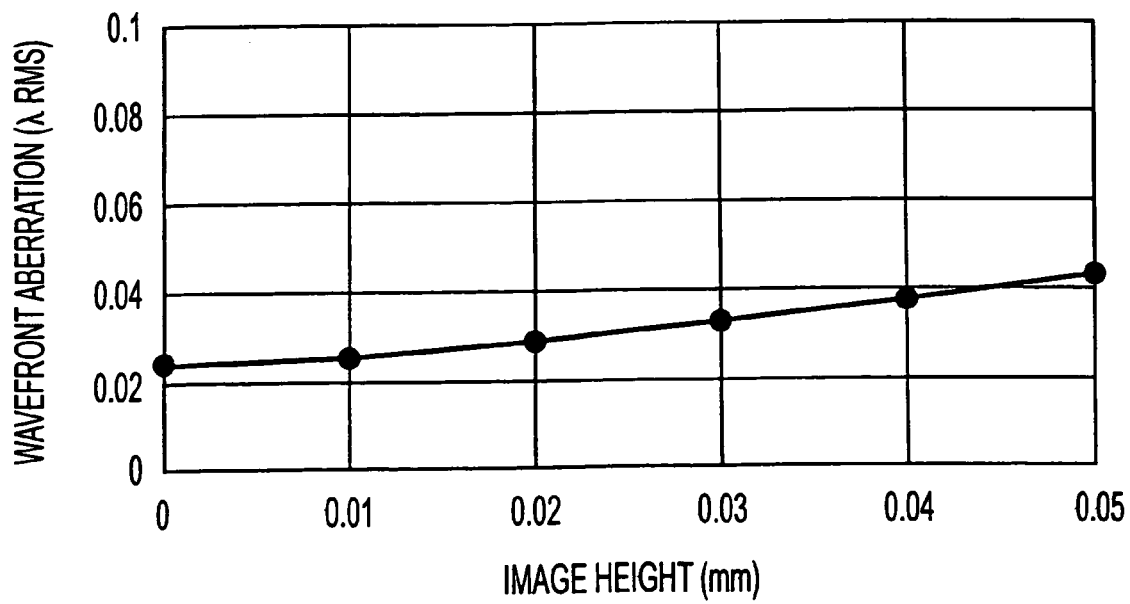

FIGS. 4A and 4B show calculation results regarding the RMS wavefront aberration in the first embodiment. In the graph shown in FIGS. 4A and 4B, the horizontal axis is image height (mm), and the vertical axis is RMS wavefront aberration.

FIG. 4A shows the RMS wavefront aberration for a DVD (wavelength $\lambda_1=655$ nm), and when the image height is 0 mm, the RMS wavefront aberration is $0.02130\lambda_1$. FIG. 4B shows the RMS wavefront aberration for a CD (wavelength $\lambda_2=790$ nm), and when the image height is 0 mm, the RMS wavefront aberration is $0.02410 \lambda_2$.

The above values are now substituted into each of the above formulas for the evaluation. The results are as follows:

(i) First, for the DVD and CD, the RMS wavefront aberrations are respectively $0.02130\lambda$ and $0.02410\lambda$, which are smaller than the allowable values of $0.035\lambda$, $0.033\lambda$, or $0.030\lambda$ (ii) For the DVD and CD, from the Formula 7, Formula 8:

$$\sqrt{(W_1^2 + W_2^2)/2} = \sqrt{(0.02130^2 + 0.02410^2)/2} = 0.02274;$$

therefore, the value given is under the allowable value of 0.028 (or preferably 0.026, 0.025, or 0.023).

(iii) For the DVD and CD, $W_{max}/W_{min}$ is given as follows. $W_{max}/W_{min}=0.02410/0.02130=1.1315$ Accordingly, it is under the allowable value of 1.8, 1.6. or 1.4.

Figure 5A:
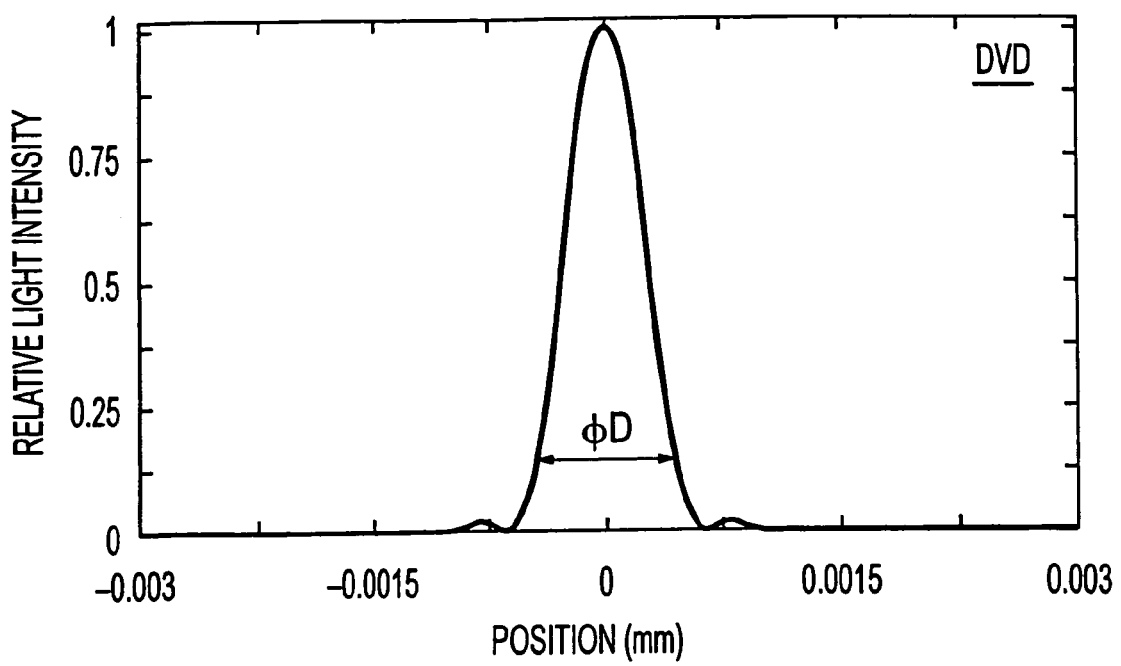
FIGS. 5A and 5B are diagrams to show a calculation result of optical spots for different types of optical discs in an optical disc apparatus employing the first embodiment shown in FIG. 1.
Figure 5B:
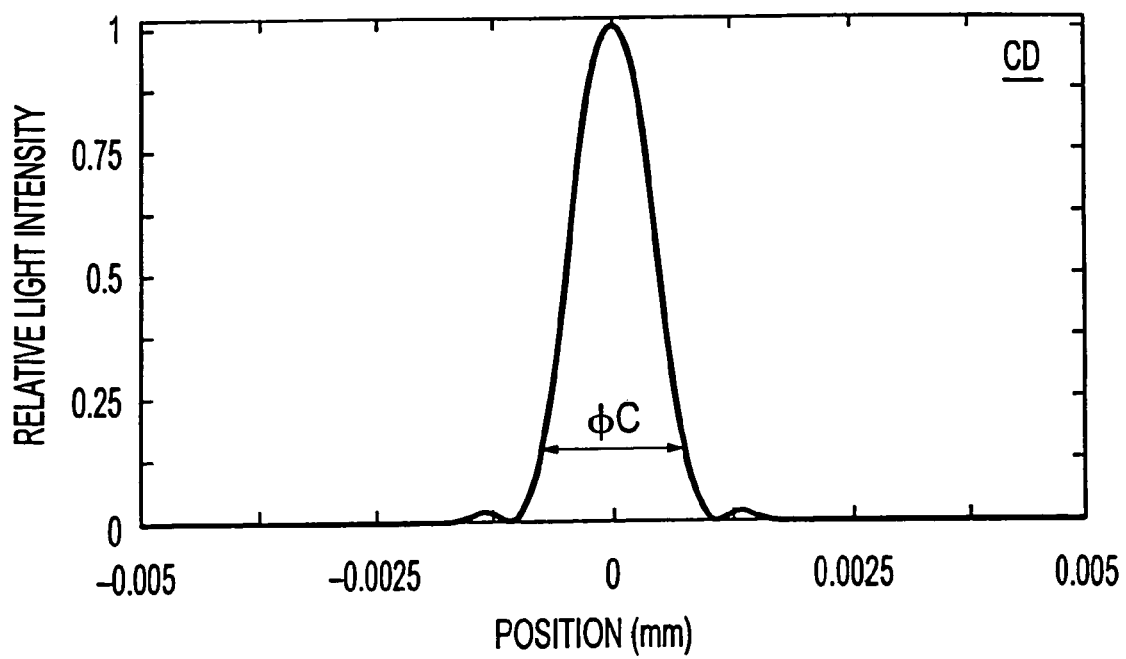

FIGS. 5A and 5B show calculation results regarding optical spots on the information surfaces of the DVD and CD when using the objective lens 1 provided with the light output side B having the surface configuration expressed by Formula 5, and the light incident side A having the surface configuration shown in Table 1. In FIGS. 5A and 5B, the horizontal axis shows a position in a vertical direction expressed by the distance (mm) from the reference point where the optical axis is on the information surface, and the vertical axis shows a relative light intensity in each position when a light intensity at the reference point (=0 mm) is 1.

FIG. 5A shows optical spots for a DVD, and an optical spot with the relative light intensity of $1/e^2(=13.5\%)$ has a diameter φD of 0.85 μm. FIG. 5B shows optical spots for a CD, and an optical spot with the relative light intensity of $1/e_2$ has a diameter φc of 1.37 μm. Thus, both for the DVD and CD, optical spots are appropriately produced on the information surface.

Now, the second embodiment of the objective lens according to the present invention will explained hereinbelow.

In the second embodiment whose basic configuration is the same as the first embodiment, the light incident side A is radially sectioned into plural zones from the optical axis, and each zone surface is configured so that the aberrations for both DVD and CD are reduced to fall within the allowable value.

The surface configuration of the light incident side A according to the second embodiment will be explained hereinafter with reference to FIG. 2. The distance between the points a and b in a j-th zone from the optical axis OA in the direction of the light height h (in the radial direction) on the light incident side A is expressed by the following function $Z_{Aj}$ Formula 9:

$$Z_{Aj} = B + \frac{Ch^2}{1 + \sqrt{1 - (K+1^2)Ch^2}} + A_4 \cdot h^4 + A_6 \cdot h^6 + A_8 \cdot h^8 + A_{10} \cdot h^{10} + A_{12} \cdot h^{12} + A_{14} \cdot h^{14} + A_{16} \cdot h^{16}$$

The light height h in Formula 9 is that in the j-th zone.

The following table shows the range of h and the constant B, C, K, $A_4$, $A_6$, $A_8$, $A_{10}$, $A_{12}$, $A_{14}$, and $A_{16}$ for each zone in Formula 9 to reduce the aberrations for both DVD and CD to be within the allowable value range.

The surface configuration $Z_B$ of the light output side B according to the second embodiment is expressed by the following formula:

Formula 10:

$$Z_B = \frac{Ch^2}{1 + \sqrt{1 - (K+1)C^2 \cdot h^2}} + A_4 \cdot h^4 + A_6 \cdot h^6 + A_8 \cdot h^8 + A_{10} \cdot h^{10},$$

where
C=−0.0747792 K=15.7398 $A_4$=0.012308
$A_6$=−0.0037652 $A_8$=0.00068571 $A_{10}$=−0.000048284.

The distance between the surface apexes f and e on the optical axis of the objective lens 1, that is, the center thickness $t_0$, is 2.2 mm. The refractive index n for wavelength $\lambda_1$=655 nm (DVD) is 1.604194, and the refractive index n for wavelength $\lambda_2$=790 nm (CD) is 1.599906.

Here, the allowable value for the aberration for evaluation is the same as the first embodiment.

Figure 6A:
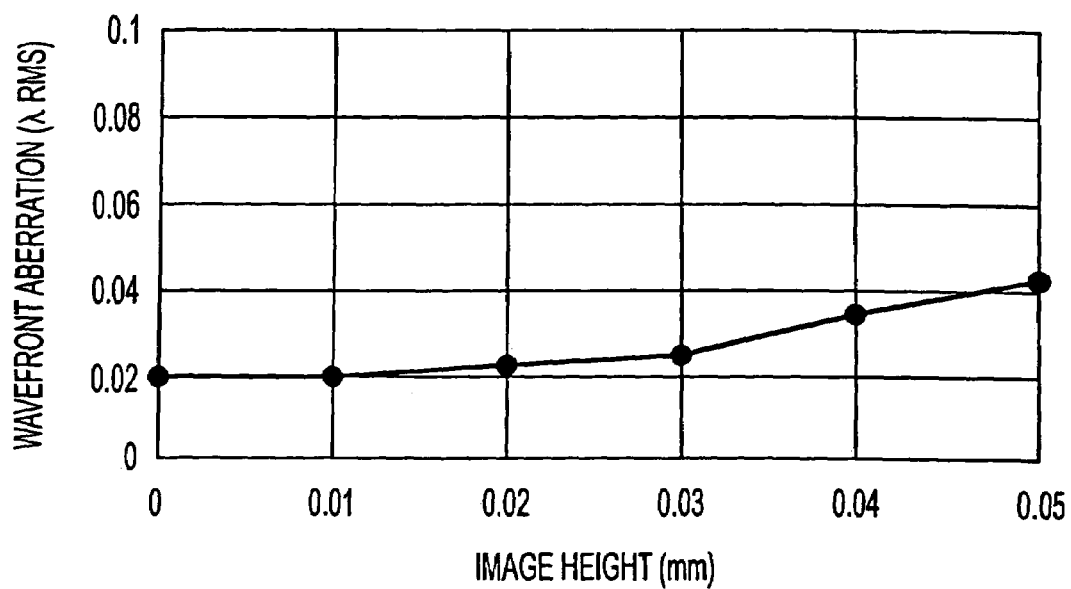
FIGS. 6A and 6B are graphs to show an example of a measurement result of wavefront aberration in an objective lens according to the present invention, in accordance with the second embodiment.
Figure 6B:
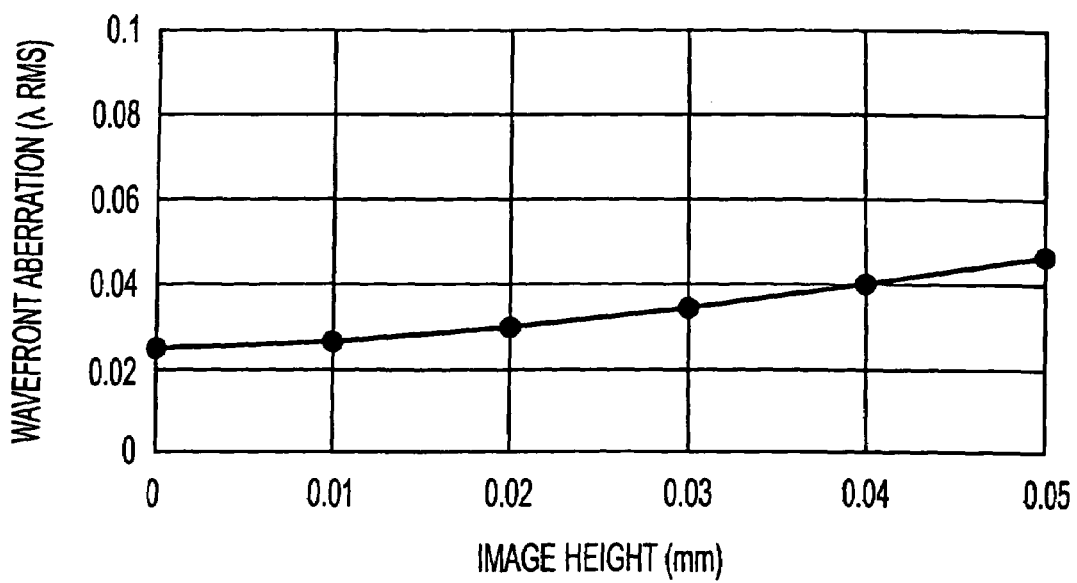

FIGS. 6A and 6B show calculation results regarding the RMS wavefront aberration in the second embodiment. In the graph, the horizontal axis and vertical axis are the same as FIGS. 4A and 4B.

FIG. 6A shows the RMS wavefront aberration for a DVD (wavelength $\lambda_1$=655 nm), and when the image height is 0 mm, the RMS wavefront aberration is $0.01945\lambda_1$. FIG. 6B shows the RMS wavefront aberration for a CD (wavelength $\lambda_2$=790 nm), and when the image height is 0 mm, the RMS wavefront aberration is $0.02525 \lambda_2$.

Figure 11:
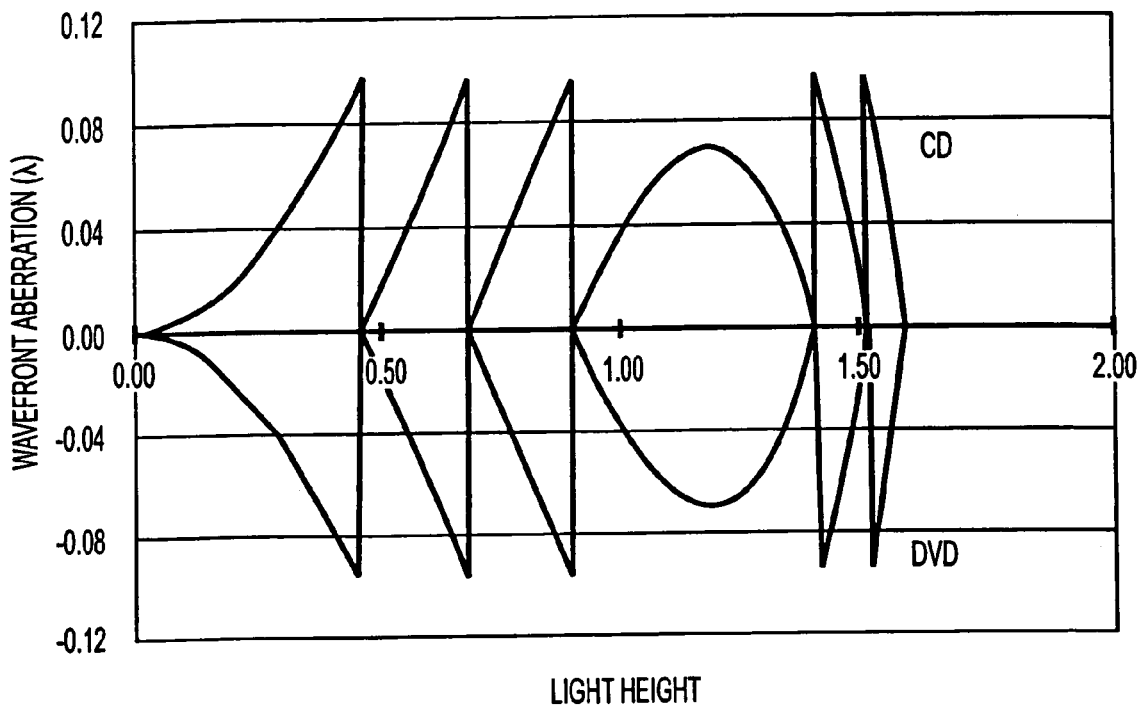
FIG. 11 is a diagram to show wavefront aberration for each wavelength for light height in the second embodiment.

FIG. 11 shows a calculation result regarding the wavefront aberration on the lens in the common use area. The following table shows the difference in the wavefront aberration and the ratio of the differences, in each of the aspherical zones:

TABLE 3

|  | Area 1 | Area 2 | Area 3 | Area 4 | Area 5 | Area 6 |
|---|---|---|---|---|---|---|
| $\Delta V_d(\lambda 655)(\lambda)$ | 0.0955 | 0.0960 | 0.0963 | 0.0692 | 0.0939 | 0.0937 |
| $\Delta V_d(\lambda 790)(\lambda)$ | 0.0977 | 0.0973 | 0.0967 | 0.0701 | 0.0974 | 0.0976 |
| $\Delta V_d(\lambda 790)/\Delta V_d(\lambda 655)$ | 1.02 | 1.01 | 1.00 | 1.01 | 1.04 | 1.04 |

TABLE 2

| 区間j | hの範囲 | B | C | K | A4 |
|---|---|---|---|---|---|
| 1 | 0~0.464667 | 0 | 4.45390E−01 | −6.67483 | 0.030017 |
| 2 | 0.464667~0.687967 | 0.00108409 | 4.46999E−01 | −8.52884E−01 | −1.11390E−03 |
| 3 | 0.687967~0.904685 | 0.00216818 | 4.45826E−01 | −5.85171E−01 | 2.36910E−03 |
| 4 | 0.904685~1.414529 | 0.00325226 | 4.46759E−01 | −6.51167E−01 | 9.59140E−04 |
| 5 | 1.414529~1.519145 | 0.00216818 | 4.28660E−01 | −3.27869E−01 | 6.74850E−03 |
| 6 | 1.519145~1.589366 | 0.00108409 | 4.42061E−01 | −5.74561E−01 | 2.50970E−03 |
| 7 | 1.589366~1.847991 | 0.00103073 | 4.45481E−01 | −6.24870E−01 | 1.77360E−03 |
| 8 | 1.847991~2.2 | −0.00113744 | 4.45319E−01 | −6.13552E−01 | 1.64620E−03 |

| A6 | A8 | A10 | A12 | A14 | A16 |
|---|---|---|---|---|---|
| 1.026695 | −14.364412 | 106.233381 | −431.806672 | 895.812958 | −725.25403 |
| 8.21580E−03 | 9.75070E−03 | −3.03780E−02 | −4.03770E−02 | 1.80080E−01 | −1.49931E−01 |
| −5.00360E−03 | 4.59410E−03 | 3.04280E−03 | −8.16540E−03 | 6.55040E−03 | −2.40830E−03 |
| 4.83750E−04 | 2.53240E−04 | −1.24670E−04 | −1.01670E−04 | 7.59740E−05 | −1.37590E−05 |
| 3.92010E−04 | −1.18360E−03 | −4.24370E−04 | 7.93880E−05 | 1.45720E−04 | −3.75090E−05 |
| 1.75070E−04 | −2.24990E−04 | −1.73810E−05 | 6.71230E−07 | 1.64740E−05 | −3.96660E−06 |
| 1.24130E−04 | −7.34610E−05 | 2.76610E−05 | −9.44330E−06 | 1.32750E−06 | −6.17570E−08 |
| 1.15930E−04 | −7.50480E−05 | 2.80220E−05 | −9.53270E−06 | 1.33720E−06 | −6.23130E−08 |

TABLE 3-continued

|  | Area 1 | Area 2 | Area 3 | Area 4 | Area 5 | Area 6 |
|---|---|---|---|---|---|---|
| $\Delta V_d(\lambda 655)/$ $\Delta V_d(\lambda 790)$ | 0.98 | 0.99 | 1.00 | 0.99 | 0.96 | 0.96 |

As shown in Table 3, in the common use area of 790 nm and 655 nm, the ratio of the difference $\Delta V_d(\lambda 790)(\lambda)/\Delta V_d(\lambda 655)$ of each wavefront aberration falls in the range of 1.00 and 1.04. The ratio $\Delta V_d(\lambda 655)/\Delta V_d(\lambda 790)$ is in the range of 0.96 and 1.00. The difference of wavefront aberration itself in each area is no more than $0.14\lambda$ in both wavelengths. In the lens, the wavefront aberration is produced at a positive side for 790 nm wavelength, and at a negative side for 655 nm wavelength; also, the wavefront aberrations become approximately symmetric.

There is generated the differences in the optical path length between the adjacent aspherical zones sectioned centered on the optical axis. The differences are set to be integral multiple corresponding to each wavelength. In the present embodiment, there are even number of sectioned aspherical zones.

The above values are now substituted into each of the above formulas for the evaluation, as is the case with the first embodiment. The results are as follows:

(i) First, for the DVD and CD, the RMS wavefront aberrations are respectively $0.01945\lambda$ and $0.02525\lambda$, which are smaller than the allowable values of $0.035\lambda$, $0.033\lambda$, or $0.030\lambda$ (ii) For DVD and CD, from the Formula 7,
Formula 11:

$$\sqrt{(W_1^2+W_2^2)/2} = \sqrt{(0.01945^2+0.02525^2)/2} = 0.02254;$$

therefore, the value given is under the allowable value of 0.028, 0.026, 0.025, or 0.023.

(iii) For DVD and CD, $W_{max}/W_{min}$ is given as follows.

$W_{max}/W_{min}=0.02525/0.01945=1.298$

Accordingly, it is under the allowable value of 1.8, 1.6. or 1.4.

Figure 7A:
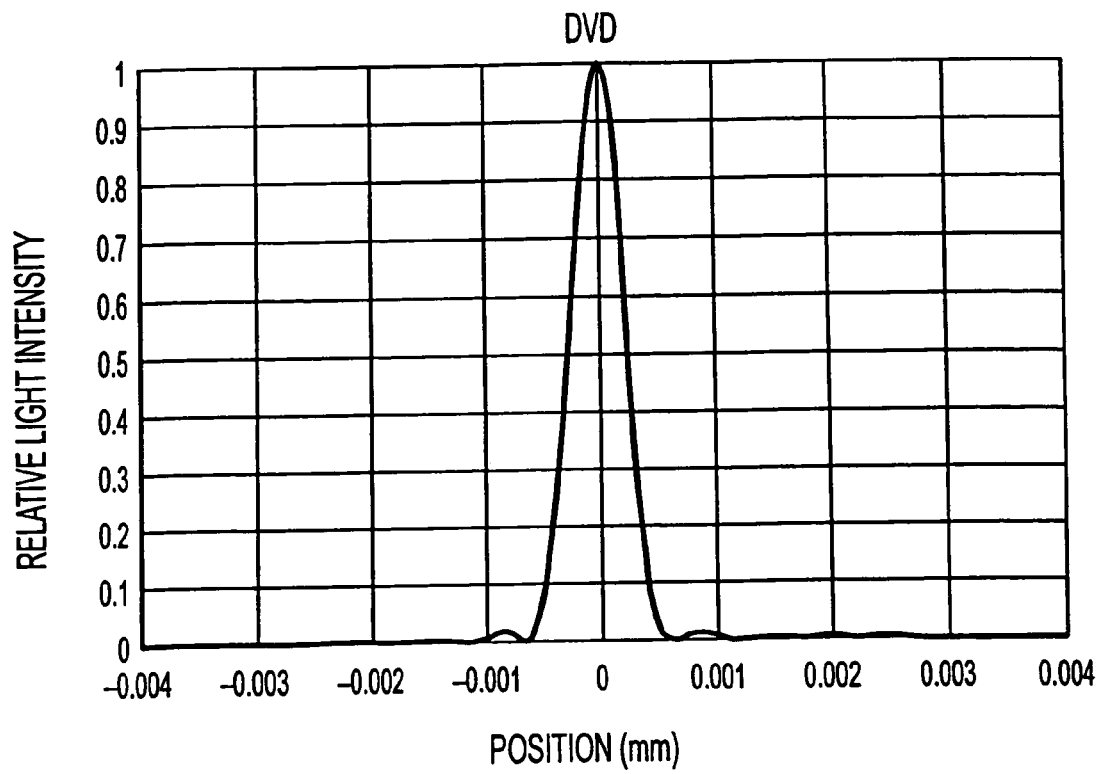
FIGS. 7A and 7B are diagrams to show a calculation result of optical spots for different types of optical discs in an optical disc apparatus employing the objective lens according to the present invention, in accordance with the second embodiment.
Figure 7B:
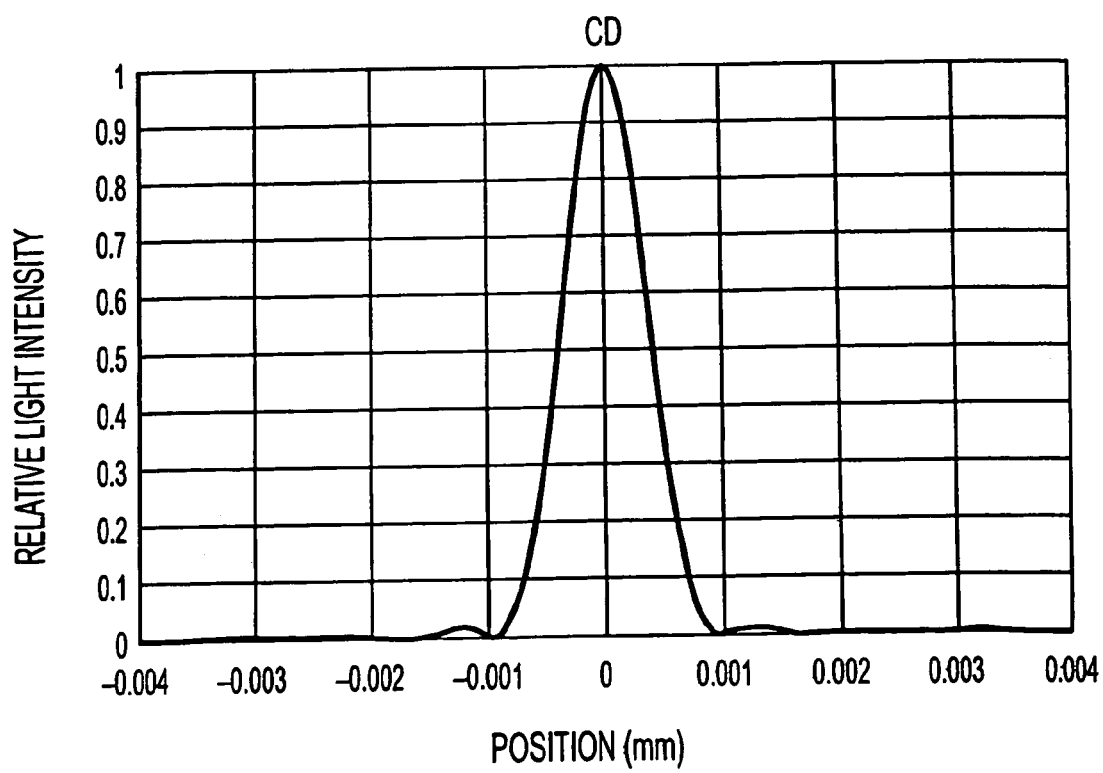

FIGS. 7A and 7B show calculation results regarding optical spots on the information surfaces of a DVD and CD when using the objective lens 1 provided with the light output side B having the surface configuration expressed by Formula 10, and the light incident side A having the surface configuration expressed by Formula 9 and shown in Table 2. The horizontal axis and vertical axis of the graph is the same as FIG. 5.

FIG. 7A shows optical spots for a DVD, and an optical spot with the relative light intensity of $1/e^2(=13.5\%)$ has a diameter $\phi D$ of 0.89 μm. FIG. 7B shows optical spots for a CD, and an optical spot with the relative light intensity of $1/e^2$ has a diameter $\phi c$ of 1.30 μm. Thus, both for DVD and CD, optical spots are appropriately produced on the information surface.

In the second embodiment, the ratio is 0.96 to 1.04 in Table 3, and the RMS wavefront aberration for the DVD is $0.01945\lambda_1$ and that for the CD is $0.02525\lambda_2$. However, it is possible to produce equal RMS wavefront aberrations of around 0.022 to $0.023\lambda$ for the DVD and CD by increasing the aberration for the DVD while reducing that for the CD in the common use area, as explained above with reference to FIG. 10.

The RMS wavefront aberrations for a DVD and CD disclosed in Japanese Patent Application Laid-Open No. 2001-51192, for example, are as follows.

EXAMPLE 1

DVD: $0.001\lambda_1$ CD: $0.047\lambda_2$

EXAMPLE 2

DVD: $0.019\lambda_1$ CD: $0.037\lambda_2$
($\lambda_1=640$ nm, and $\lambda_2=780$ nm)

Each of the above values is over the allowable value of $0.035\lambda$.

Figure 12:
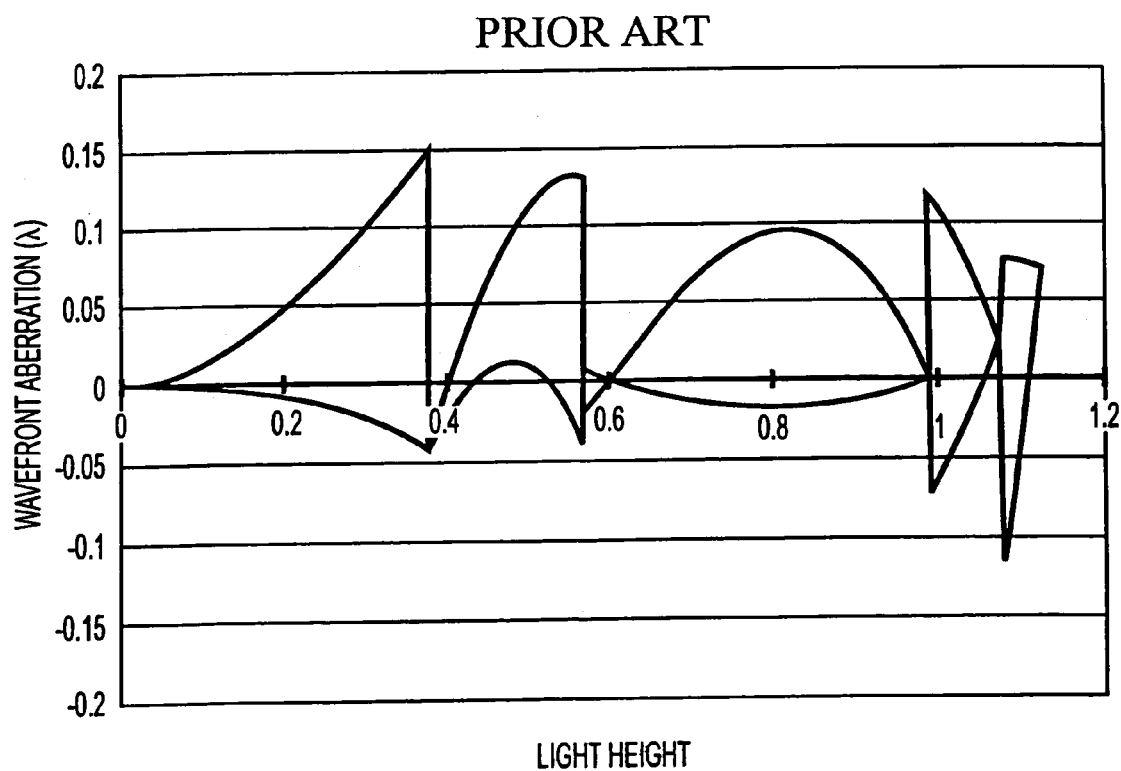
FIG. 12 is a diagram to show wavefront aberration for each wavelength for light height when using a lens disclosed in Japanese Patent Application Laid-Open No. 2001-51192.

Besides, when calculating the wavefront aberration of lens for each wavelength in example 2 by using the lens data disclosed in the above application, as shown in the following table 4 and FIG. 12, the ratio of the difference, $\Delta V_d(\lambda 655)/\Delta V_d(\lambda 790)$ is 0.21 through 33.44 and $\Delta V_d(\lambda 790)(\lambda)/\Delta V_d(\lambda 655)$ is 0.03 through 4.72, which are outside of the limits set for the present invention, thus being out of balance. In addition, while the wavefront aberration produced for the DVD is no more than $0.14\lambda$, that for the CD are large, and therefore the RMS wavefront aberration of lens as a whole become large.

TABLE 4

|  | Area 1 | Area 2 | Area 3 | Area 4 | Area 5 |
|---|---|---|---|---|---|
| $\Delta V_d(\lambda 655)(\lambda)$ | 0.0415 | 0.0518 | 0.0242 | 0.1012 | 0.1906 |
| $\Delta V_d(\lambda 790)(\lambda)$ | 0.1489 | 0.1635 | 0.1142 | 0.1039 | 0.0057 |
| $\Delta V_d(\lambda 655)/$ $\Delta V_d(\lambda 790)$ | 0.28 | 0.32 | 0.21 | 0.97 | 33.44 |
| $\Delta V_d(\lambda 790)/$ $\Delta V_d(\lambda 655)$ | 3.59 | 3.16 | 4.72 | 1.03 | 0.03 |

When the values are substituted into the following formula:

$$\sqrt{(W_1^2+W_2^2)/2}$$

Formula 12:

it gives 0.0332 and 0.0294 respectively, both of which are over the allowable value of 0.028, preferably 0.026, more preferably 0.025, and further preferably 0.023. Further, the value of $W_{max}/W_{min}$ for those are 47 and 1.847 respectively, both of which are over the allowable value of 1.8, preferably 1.6, and more preferably 1.4.

As explained in the foregoing, the first and second embodiments are capable of keeping the aberration within the allowable value because the lens surface has such a configuration that spherical aberration generated by a difference in substrate thickness and chromatic aberration cancel each other out to bring the total aberration within the allowable value. On the other hand, the technique disclosed in Japanese Patent Application Laid-Open No. 2001-51192 reduces the aberration for a CD by phase-shifting the incident laser beam for integral multiple of the wavelength of the DVD laser beam. Though the technique is able to sufficiently reduce the aberration for either one of the wavelengths, it is unable to keep the aberration for all of the wavelengths at the same time within the allowable limit of such a small value.

It is obvious from the optical spots shown in FIGS. 5A, 5B, 7A, and 7B, and the wavefront aberration shown in the graphs in FIGS. 4A, 4B, 6A, and 6B that, in the above embodiment, the spherical aberration caused by a difference in substrate thickness between DVD and CD, which is, 0.6 mm and 1.2 mm respectively, are canceled by the chromatic aberration caused by a difference in wavelength, 655 nm and 790 nm respectively, to reduce the total aberration. Besides, in the embodiments, the objective lens 1 has the light incident side A whose surface configuration is given by the sequence data in Table 1, Formula 9, and Table 2, and the light output side B whose surface configuration is given by the aspherical surface formulas expressed by Formula 5 and 10, which is different from the diffractive lens surface as disclosed in the conventional technique. Further, the objective lens 1 is able to condense approximately all luminous flux for numerical aperture (NA) necessary for recordation or reproduction, thereby obtaining the high light use efficiency.

In the above embodiment, the outer area of the objective lens 1 having numerical aperture of approximately NA=0.47 to NA=0.63 is used only for a DVD, and not used for a CD, as shown in FIG. 1. Therefore, it is possible to form a thin film through which light of the 655 nm DVD wavelength passes and light of the 790 nm CD wavelength does not pass on either one or both of the light incident side A and the light output side B in the outer area. It is also possible to form a diffraction grating not acting on light of the 655 nm wavelength, but acting on light of the 790 nm wavelength on either one or both of the light incident side A and the light output side B in the outer area. In this configuration, the light use efficiency for light having the 790 nm wavelength can be reduced without reducing the light use efficiency for light having the 655 nm wavelength.

When the present invention is applied to systems having different numerical apertures but not having the diaphragm according to the numerical apertures, the lens receives excess luminous flux in a system having smaller numerical aperture. Therefore, it is preferable to make arrangements such that the light passing through the outer area of the lens designed according to an optical system having larger numerical aperture does not have adverse effects on an optical system having smaller numerical aperture. For example, an amount of transverse aberration is preferably 0.015 mm and over.

Though the above embodiment has been given of the case using optical discs of two types, a DVD and CD, the present embodiment is not limited thereto, whereas it is applicable to the case using other optical discs of different types or optical discs of more than two types provided with substrates having different thickness. In these cases, laser beams are set to have different wavelengths, and a lens surface is configured so that chromatic aberration cancels wavefront aberration out according to the wavelength.

Further, the present invention is also effective in reducing aberration when applied to the case where substrate thickness is the same but wavelength is different, causing large aberration with conventional lens.

Figure 8:
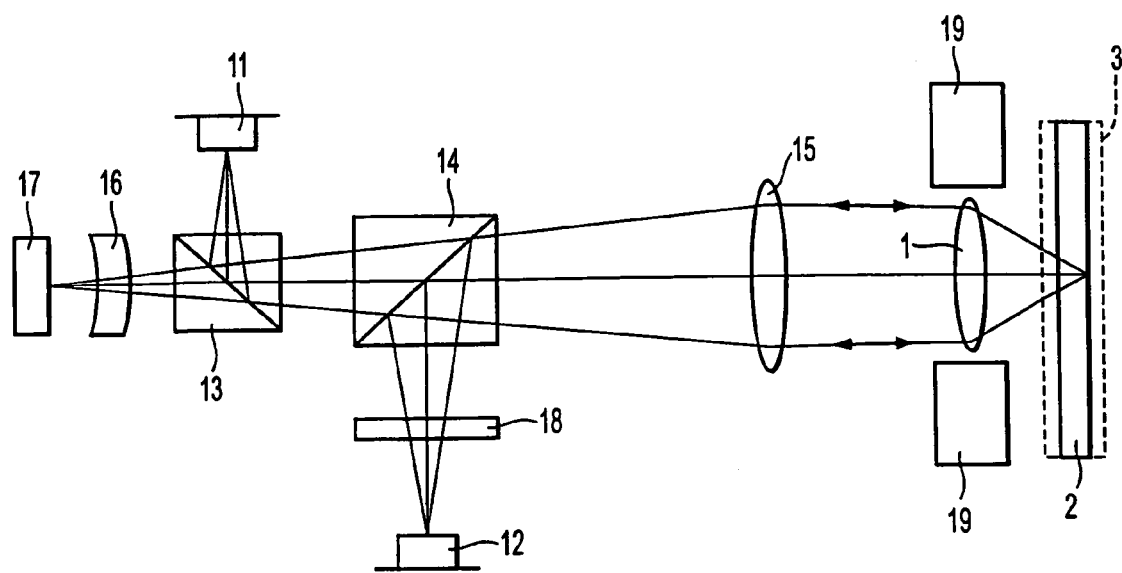
FIG. 8 is a diagram to show an embodiment of an optical head according to the present invention.

FIG. 8 shows a preferred embodiment of an optical head using the objective lens according to the present invention. In FIG. 8, reference symbol 11 denotes a DVD laser, 12 a CD laser, 13 and 14 half prism, 15 a collimator lens, 16 a detection lens, 17 a light detector, 18 a diffraction grating, and 19 an actuator. The same elements as in FIG. 1 are denoted by the same reference symbols.

In FIG. 8, in a case of recording or reproducing the DVD disc 2, the DVD laser 11 is driven. A laser beam of the 655 nm wavelength generated in the DVD laser 11 is reflected by the half-prism 13, passes through the half-prism 14, and enters the collimator lens 15. Becoming parallel light at the collimator lens 15, the laser beam enters the objective lens 1 where it is condensed to form an optical spot on an information surface of the DVD disc 2. Then, the reflected light reflected by the DVD disc 2 becomes parallel light at the objective lens 1 to enter the collimator lens 15. At the collimator lens 15, the parallel light then becomes condensed light, which passes through the half-prisms 14 and 13 and the detection lens 16 to reach the light detector 17. Detection output signals in the light detector 17 are delivered to a signal processing circuit (not shown) where information recording and reproducing signals, focus error signals, and tracking error signals are obtained. A system control circuit (not shown) then controls an actuator drive circuit (not shown) to drive the actuator 19 so that the objective lens 1 is positioned in an appropriate focus position and tracking position based on the obtained focus error signals and tracking error signals.

On the other hand, in a case of recording or reproducing the CD disc 3, the CD laser 12 is driven. A laser beam of the 790 nm wavelength generated in the CD laser 11 passes through the diffraction grating 18, is reflected by the half-prism 14, and enters the collimator lens 15. Becoming parallel light at the collimator lens 15, the laser beam enters the objective lens 1 where it is condensed to form an optical spot on an information surface of the CD disc 3. Then, the reflected light reflected by the CD disc 3 becomes parallel light at the objective lens 1 to enter the collimator lens 15. At the collimator lens 15, the parallel light then becomes condensed light, which passes through the half-prisms 14 and 13 and the detection lens 16 to reach the light detector 17. Detection output signals in the light detector 17 are delivered to a signal processing circuit (not shown) where information recording and reproducing signals, focus error signals, and tracking error signals are obtained.

The tracking error signals in the case of CD disc 3 are obtained by ±first order light, which is one of three beams, zero-order light and ±first order light, diverged from the laser beam from the CD laser 12 with the diffraction grating 18.

Based on the tracking error signals obtained as above and the focus error signals, as is the case with the DVD disc 2, the actuator 19 is driven to arrange objective lens 1 in an appropriate focus position and tracking position.

It is also possible to make an optical configuration in the optical systems common to both discs, such as the collimator lens 15 or the half-prism 14, instead of in the objective lens, so that they have the same functions as the objective lens according to the present invention. Also, while not shown, another optical element having the same functions as the objective lens of the present invention may be arranged on the optical path from the half-prism 14 through the disc 2 or 3.

The collimator lens 15 is not necessary, and the present invention is also applicable to an optical system of a so-called finite system.

Figure 9:
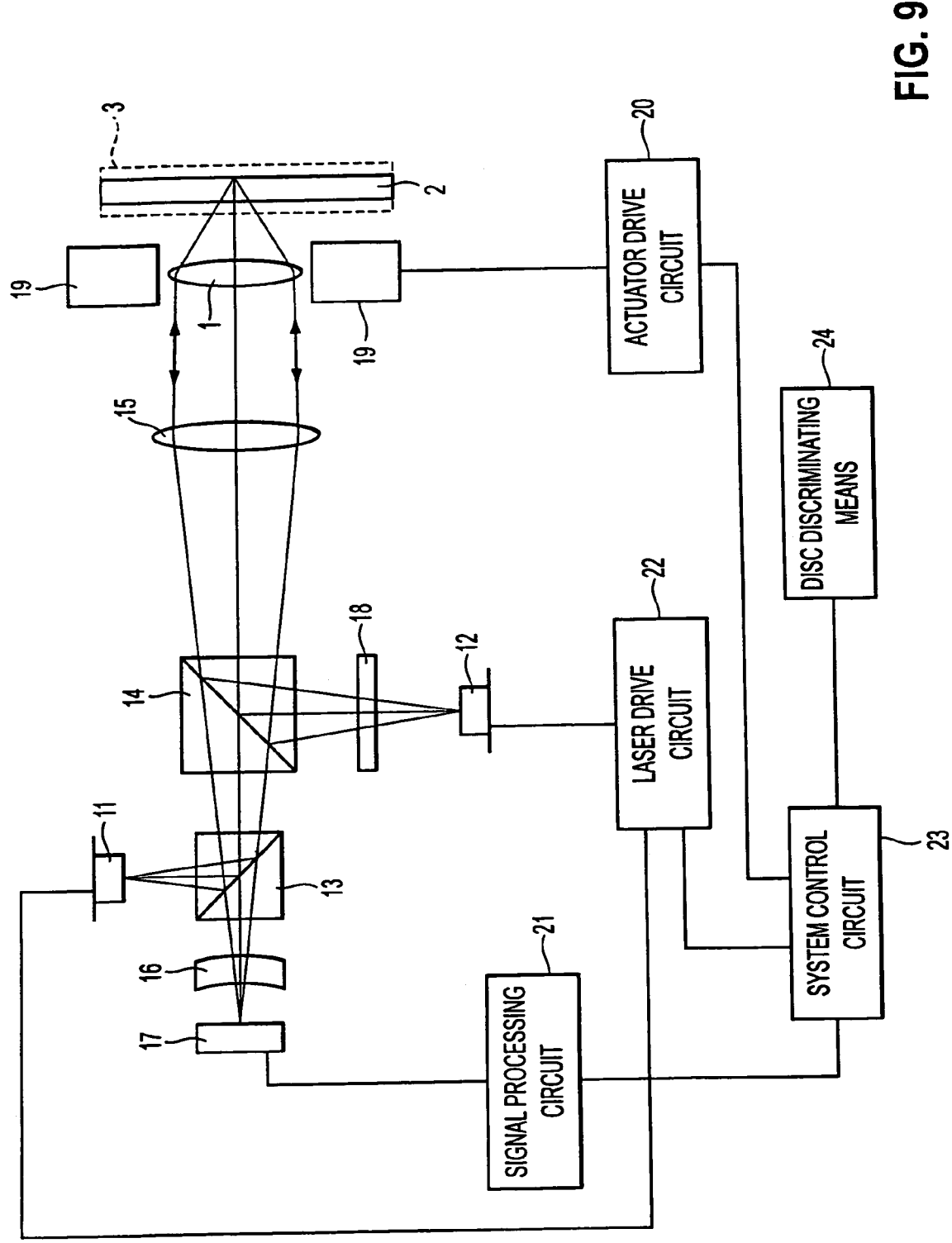
FIG. 9 is a diagram to show an embodiment of an optical disc apparatus according to the present invention.

FIG. 9 shows a preferred embodiment of an optical disc apparatus using the objective lens according to the present invention. In FIG. 9, reference symbol 20 denotes an actuator drive circuit, 21 a signal processing circuit, 22 a laser drive circuit, 23 a system control circuit, and 24 disc discriminating means. The same elements as in FIG. 8 are denoted by the same reference symbols.

In FIG. 9, the configuration of the optical pickup apparatus is the same as shown in FIG. 8.

First, the disc distinguishing means 24 distinguishes a type of a disc loaded. Among methods for distinguishing the disc are a method detecting the thickness of the disc substrate optically or mechanically and a method detecting a reference mark preciously stored in the disc or a disc cartridge. Or, there is also a method reproducing disc signals with tentative disc thickness and type, and judging that it is a disc of another thickness and type if normal signals are not obtained. The disc distinguishing means 24 then transmits the result to the system control circuit 23.

When the result shows that the disc is the DVD disc 2, the system control circuit 23 transmits a signal for lighting the DVD laser 11 to the laser drive circuit 22, and the DVD laser 11 lights by the laser drive circuit 22. Thus, in an optical head, the laser beam having the 655 nm wavelength reaches the light detector 17, as is the embodiment shown in FIG. 8. The light detector 17 then transmits detection signals to the signal processing circuit 21 where information recording and reproducing signals, focus error signals, and tracking error signals are generated and transmitted to the system control circuit 23. The system control circuit 23 controls the actuator drive circuit 20 based on the focus error signals and tracking error signals to drive the actuator 19, thereby moving the objective lens 1 in the focus direction and tracking direction, which is called a servo circuit operation. By this operation, the focus control and tracking control are regularly processed, and the above circuits and the actuator 19 operate to arrange the object lens 1 in a right position to the DVD disc 2, thus suitably obtaining the information recording and reproducing signals.

On the other hand, when the result shows that the disc loaded is the CD disc 3, the system control circuit 23 transmits a signal for lighting the CD laser 12 to the laser drive circuit 22. The CD laser 12 thus generates the laser beam having the 790 nm wavelength. The subsequent operations are the same as the case of the optical head shown in FIG. 8. The laser beam reaches the light detector 17, and the circuits and the actuator 19 process the servo operation to obtain the information recording and reproducing signals suitably, as is the case with the DVD disc 2.

As explained in the foregoing, the present invention makes it possible to condense by refraction all luminous flux of numerical aperture (NA) necessary for recordation and reproduction on a desirable position with aberration of as small as possible for more than one type of optical discs provided with transparent substrate having different thickness, without using diffractive lens structure, thus increasing the light use efficiency. Besides, as also explained above, according to the present invention, in a multiple wavelengths optical system using plural monochromatic lights, each of sectioned aspherical surface has a single focal point corresponding to inherent wavelength of each of the monochromatic lights, and the focal points are respectively arranged in different positions. The present invention is applicable to an optical system in an optical communication.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An objective lens for plural types of optical storage medium having transparent substrates of different thickness, the objective lens receiving light beams of different wavelengths, each corresponding to each of the plural types of optical storage medium and having a positive power to condense the light beam onto an information surface on each of the transparent substrates of the plural types of optical storage medium;
    wherein a lens surface of the objective lens is sectioned into plural aspherical zones having different refractive power radially from an optical axis in a common use region for all the light beams,
    the plural aspherical zones respectively have a single focal point corresponding to an inherent wavelength of each of the light beams, the focal point corresponding to the inherent wavelength of each of the light beams being arranged in a different position, and
    the objective lens substantially cancels out spherical aberration caused by a thickness difference between the transparent substrates with chromatic aberration caused by a difference in the wavelength of each of the light beams, by which the objective lens condenses the light beam onto the information surface with a Root Mean Square (RMS) wavefront aberration ratio of:

$$1 \leq W_{max}/W_{min} < 1.8$$

where $W_{max}$ is a maximum RMS wavefront aberration among RMS wavefront aberrations of each of the light beams and $W_{min}$ is a minimum RMS wavefront aberration among RMS wavefront aberrations of each of the light beams, for each of the plural types of optical storage medium.

2. An objective lens according to claim 1, wherein the objective lens condenses the light beam onto the information surface with the RMS wavefront aberration ratio of:

$$1 \leq W_{max}/W_{min} < 1.6.$$

3. An objective lens according to claim 1, wherein the objective lens condenses the light beam onto the information surface with the RMS wavefront aberration ratio of:

$$1 \leq W_{max}/W_{min} < 1.4.$$

4. An objective lens according to claim 1, wherein the objective lens condenses the light beam onto the information surface with the RMS wavefront aberration of no more than $0.035\lambda$ for each of the plural types of optical storage medium.

5. An objective lens according to claim 1, wherein the different wavelengths of the light beams comprise at least two kinds of wavelengths selected from substantially 790nm, 650nm and 405nm.

6. An objective lens for plural types of optical storage medium having transparent substrates of different thickness, the objective lens receiving light beams of different wavelengths, each corresponding to each of the plural types of optical storage medium and having a positive power to condense the light beam onto an information surface on each of the transparent substrates of the plural types of optical storage medium;
    wherein a lens surface of the objective lens is sectioned into plural aspherical zones having different refractive power radially from an optical axis in a common use region for all the light beams,
    the plural aspherical zones respectively have a single focal point corresponding to an inherent wavelength of each of the light beams, the focal point corresponding to the inherent wavelength of each of the light beams being arranged in a different position, and
    the objective lens substantially cancels out spherical aberration caused by a thickness difference between the transparent substrates with chromatic aberration caused by a difference in the wavelength of each of the light beams, by which the objective lens condenses the light beam onto the information surface with a RMS wavefront aberration satisfying a following formula:

$$\sqrt{(\Sigma W_i^2)/i} \leq 0.028$$

where $\lambda_i$ (i=1, 2, ...) is a wavelength of the i-th light beam and $\Sigma W_i^2$ is a sum of square of each RMS wavefront aberration for all wavelengths when $W_i$ is a RMS wavefront aberration of a light beam having the wavelength $\lambda_i$ for each of the plural types of optical storage medium.

7. An objective lens according to claim 6, wherein the objective lens condenses the light beam onto the information surface with a RMS wavefront aberration satisfying a following formula:

$$\sqrt{(\Sigma W_i^2)/i} \leq 0.023$$

for each of the plural types of optical storage medium.

8. An objective lens for plural types of optical storage medium having transparent substrates of different thickness, the objective lens receiving light beams of different wavelengths, each corresponding to each of the plural types of optical storage medium and having a positive power to condense the light beam onto an information surface on each of the transparent substrates of the plural types of optical storage medium;

wherein at least one surface of the objective lens comprises a first region condensing the light beams of different wavelengths onto information surfaces of the plural types of optical storage medium, and a second region located outside of the first region and condensing a light beam onto an information surface of one of the plural types of optical storage medium, while not condensing another light beam onto a corresponding information surface of the optical storage medium, the first region is sectioned into plural aspherical zones having different refractive power, the aspherical zones respectively having a single focal point corresponding to an inherent wavelength of each of the light beams, the focal point corresponding to the inherent wavelength of the light beam being arranged in a different position, and the objective lens substantially cancels out spherical aberration caused by a thickness difference between the transparent substrates with chromatic aberration caused by a difference in the wavelength of each of the light beams, by which the objective lens condenses the light beam onto the information surface with a Root Mean Square (RMS) wavefront aberration ratio of:

$1 \leq W_{max}/W_{min} < 1.8$ where $W_{max}$ is a maximum RMS wavefront aberration among RMS wavefront aberrations of each of the light beams and $W_{min}$ is a minimum RMS wavefront aberration among RMS wavefront aberrations of each of the light beams, for each of the plural types of optical storage medium.

9. An objective lens according to claim 8, wherein the second region is configured so as to cause transverse aberration of equal to or more than 0.015 mm for the light beam different from the light beam to be condensed onto the information surface of the one type of optical storage medium.

10. An objective lens for plural types of optical storage medium having transparent substrates of different thickness, the objective lens receiving light beams of different wavelengths, each corresponding to each of the plural types of optical storage medium and having a positive power to condense the light beam onto an information surface on each of the transparent substrates of the plural types of optical storage medium;

wherein a lens surface of the objective lens letting through the light beam to be condensed onto the information surface on each of the transparent substrates of the plural types of optical storage medium is sectioned into plural zones radially from an optical axis, surface shapes of the plural zones of the objective lens are configured so that the objective lens condenses the light beam onto the information surface with a Root Mean Square (RMS) wavefront aberration ratio of:

$1 \leq W_{max}/W_{min} < 1.8$ where $W_{max}$ is a maximum RMS wavefront aberration among RMS wavefront aberrations of each of the light beams and $W_{min}$ is a minimum RMS wavefront aberration among RMS wavefront aberrations of each of the light beams, for each of the plural types of optical storage medium.

11. An objective lens according to claim 10, wherein the objective lens condenses the light beam onto the information surface with the RMS wavefront aberration ratio of:

$1 \leq W_{max}/W_{min} < 1.6$.

12. An objective lens according to claim 10, wherein the objective lens condenses the light beam onto the information surface with the RMS wavefront aberration ratio of:

$1 \leq W_{max}/W_{min} < 1.4$.

13. An objective lens according to claim 10, wherein the objective lens condenses a light beam onto the information surface with the RMS wavefront aberration of no more than $0.035\lambda$ for each of the plural types of optical storage medium.

14. An objective lens according to claim 10, wherein the different wavelengths of the light beams comprise at least two kinds of wavelengths selected from substantially 790nm, 650nm and 405nm.

15. An objective lens for plural types of optical storage medium having transparent substrates of different thickness to let through light beams, the objective lens receiving light beams of different wavelengths through the transparent substrates for each of the plural types of optical storage medium and having a positive power to condense the light beams onto information surfaces of the transparent substrates of the plural types of optical storage medium;

wherein a lens surface of the objective lens letting through the light beams of at least two different kinds of wavelengths to be condensed onto the information surfaces of the plural types of optical storage medium is sectioned into plural zones radially from an optical axis, a surface shape of a zone of the objective lens is configured so as to substantially cancel out spherical aberration caused by a thickness difference between the transparent substrates with chromatic aberration caused by a difference in the wavelength of each of the light beams, and the objective lens condenses a light beam with a Root Mean Square (RMS) wavefront aberration ratio of:

$1 \leq W_{max}/W_{min} < 1.8$ where $W_{max}$ is a maximum RMS wavefront aberration among RMS wavefront aberrations of each of the light beams and $W_{min}$ is a minimum RMS wavefront aberration among RMS wavefront aberrations of the light beams, for each of the plural types of optical storage medium.

16. An optical pickup apparatus comprising:

a laser generating light beams of plural different wavelengths;

an objective lens for plural types of optical storage medium having transparent substrates of different thickness, the objective lens receiving the light beams of the different wavelengths for each of the plural types of optical storage medium and having a positive power to condense the light beams onto information surfaces on the transparent substrates of the plural types of optical storage medium; and a light detector detecting a light beam passing through the objective lens and reflected by the information surface on each of the transparent substrates of the plural types of optical storage medium;

wherein a lens surface of the objective lens is sectioned into plural aspherical zones having different refractive power radially from an optical axis in a common use region for all light beams, the plural aspherical zones respectively have a single focal point corresponding to an inherent wavelength of each of the light beams, the focal point corresponding to the inherent wavelength of each of the light beams being arranged in a different position, and the objective lens substantially cancels out spherical aberration caused by a thickness difference between the transparent substrates with chromatic aberration caused by a difference in the wavelength of each of the light beams, by which the objective lens condenses the light beam onto the information surface with a Root Mean Square (RMS) wavefront aberration ratio of:

$1 \leq W_{max}/W_{min} < 1.8$ where $W_{max}$ is a maximum RMS wavefront aberration among RMS wavefront aberrations of each of the light beams and $W_{min}$ is a minimum RMS wavefront aberration among RMS wavefront aberrations of each of the light beams, for each of the plural types of optical storage medium.

17. An optical pickup apparatus comprising:

a laser generating light beams of plural different wavelengths;

an objective lens for plural types of optical storage medium having transparent substrates of different thickness, the objective lens receiving the light beams of the different wavelengths for each of the plural types of optical storage medium and having a positive power to condense the light beams onto information surfaces on the transparent substrates of the plural types of optical storage medium; and a light detector detecting a light beam passing through the objective lens and reflected by the information surface on each of the transparent substrates of the plural types of optical storage medium;

wherein a lens surface of the objective lens is sectioned into plural aspherical zones having different refractive power radially from an optical axis in a common use region for all light beams, the plural aspherical zones respectively have a single focal point corresponding to an inherent wavelength of each of the light beams, the focal point corresponding to the inherent wavelength of each of the light beam being arranged in a different position, and the objective lens substantially cancels out spherical aberration caused by a thickness difference between the transparent substrates with chromatic aberration caused by a difference in the wavelength of each of the light beams, by which the objective lens condenses the light beam onto the information surface with a RMS wavefront aberration satisfying a following formula:

$\sqrt{(\Sigma W_i^2)/i} \leq 0.028$ where $\lambda_i (i=1, 2, \ldots)$ is a wavelength of the i-th light beam and $\Sigma W_i^2$ is a sum of square of each RMS wavefront aberration for all wavelengths when $W_i$ is a RMS wavefront aberration of a light beam having the wavelength $\lambda_i$, for each of the plural types of optical storage medium.

18. An optical pickup apparatus comprising:

a laser generating light beams of plural different wavelengths;

an objective lens for plural types of optical storage medium having transparent substrates of different thickness, the objective lens receiving the light beams of the different wavelengths for each of the plural types of optical storage medium and having a positive power to condense the light beams onto information surfaces on the transparent substrates of the plural types of optical storage medium; and a light detector detecting a light beam passing through the objective lens and reflected by the information surface on each of the transparent substrates of the plural types of optical storage medium;

wherein a lens surface of the objective lens letting through the light beam to be condensed onto the information surface on each of the transparent substrates of the plural types of optical storage medium is sectioned into plural zones radially from an optical axis, surface shapes of the plural zones of the objective lens are configured so that the objective lens condenses the light beam onto the information surface with a Root Mean Square (RMS) wavefront aberration ratio of:

$1 \leq W_{max}/W_{min} < 1.8$ where $W_{max}$ is a maximum RMS wavefront aberration among RMS wavefront aberrations of each of the light beams and $W_{min}$ is a minimum RMS wavefront aberration among RMS wavefront aberrations of each of the light beams, for each of the plural types of optical storage medium.

19. A compatible objective lens defined by a pair of refractive surfaces useful for plural types of optical storage medium of different thickness of transparent substrate, having a positive power to condense the monochromatic light beams of different wavelengths corresponding to each of the plural types of optical storage medium through each of the transparent substrate onto an information surface provided on the substrate of the optical storage medium;

wherein a common use region of at least one of the refractive surfaces transmitting through each monochromatic light beam of different wavelengths to be condensed onto one of the information surface of different types of optical storage medium is sectioned into plural annular aspherical zones radially around an optical axis, and each of the annular aspherical zone is configured to cancel out chromatic aberration of a difference of wavelength and spherical aberration derived from a thickness difference of substrates, so as to condense the respective light beams corresponding to each of the optical storage medium with a Root Mean Square (RMS) wavefront aberration satisfying a following formula:

$\sqrt{(\Sigma W_i^2)/i} \leq 0.028$ where $\lambda_i (I=1, 2, \ldots)$ is a wavelength of the i-th light beam and $\Sigma W_i^2$ is a sum of square of each RMS wavefront aberration for all wavelengths when $W_i$ is a RMS wavefront aberration of a light beam having the wavelength $\lambda_i$.

20. The compatible objective lens according to claim 19, wherein the RMS wavefront aberration satisfy a following formula:

$\sqrt{(\Sigma W_i^2)/i} \leq 0.023$ for each of the different types of optical storage medium.

21. A compatible objective lens defined by a pair of refractive surfaces useful for plural types of optical storage medium of different thickness of transparent substrate, having a positive power to condense the monochromatic light beams of different wavelengths corresponding to each of the plural types of optical storage medium through each of the transparent substrate onto an information surface provided on the substrate of the optical storage medium;

wherein a common use region of at least one of the refractive surfaces transmitting through each monochromatic light beam of different wavelengths to be condensed onto one of the information surface of different types of optical storage medium is sectioned into plural annular aspherical zones radially around an optical axis, and each of the annular aspherical zone is configured to cancel out chromatic abberation of a difference of wavelength and spherical aberration derived from a thickness difference of substrates, so as to condense the respective light beams corresponding to each of the optical storage medium with a Root Mean Square (RMS) wavefront aberration ratio of:

$$1 \leq W_{max}/W_{min} < 1.8$$

where $W_{max}$ is a maximum RMS wavefront aberration among RMS wavefront aberrations of each of the light beams and $W_{min}$ is a minimum RMS wavefront aberration among RMS wavefront aberrations of each of the light beams.

22. The compatible objective lens according to claim 21, wherein the RMS wavefront aberration ratio is $$1 \leq W_{max}/W_{min} < 1.6.$$

23. The compatible objective lens according to claim 21, wherein the RMS wavefront aberration ratio is $$1 \leq W_{max}/W_{min} < 1.4.$$

24. A compatible objective lens defined by a pair of refractive surfaces useful for plural types of optical storage medium of different thickness of transparent substrate, having a positive power to condense the monochromatic light beams of different wavelengths corresponding to each of the plural types of optical storage medium through each of the transparent substrate onto an information surface provided on the substrate of the optical storage medium;

wherein a common use region of at least one of the refractive surfaces transmitting through each monochromatic light beam of different wavelengths to be condensed onto one of the information surface of different types of optical storage medium is sectioned into plural annular aspherical zones radially around an optical axis, and each of the annular aspherical zone is configured to cancel out chromatic aberration of a difference of wavelength and spherical aberration derived from a thickness difference of substrates, so as to condense the respective light beams corresponding to each of the optical storage medium with a ratio of a difference between a maximum value and a minimum value of wavefront aberration for each of the monochromatic lights is between 0.4 and 2.5 when the difference is $\Delta Vd\ (\lambda_i)$ in any of the aspherical zones (where d is an integral number of 1, 2 . . . each indicating an aspherical section, while i is an integral number of 1, 2 . . . ).

25. The compatible objective lens according to claim 24, wherein the RMS wavefront aberration of no more than 0.035λ for each of the different types of optical storage medium.

* * * * *